(12) United States Patent
Moon et al.

(10) Patent No.: US 12,091,600 B2
(45) Date of Patent: Sep. 17, 2024

(54) COMPOUND AND COLOR CONVERSION FILM COMPRISING SAME, BACKLIGHT UNIT, AND DISPLAY DEVICE

(71) Applicant: LG CHEM, LTD., Seoul (KR)

(72) Inventors: Sang Pil Moon, Daejeon (KR); Hoyong Lee, Daejeon (KR); Duy Hieu Le, Daejeon (KR); Jeeseon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 979 days.

(21) Appl. No.: 17/055,200

(22) PCT Filed: Feb. 26, 2020

(86) PCT No.: PCT/KR2020/002725
§ 371 (c)(1),
(2) Date: Nov. 13, 2020

(87) PCT Pub. No.: WO2020/175901
PCT Pub. Date: Sep. 3, 2020

(65) Prior Publication Data
US 2021/0222060 A1    Jul. 22, 2021

(30) Foreign Application Priority Data
Feb. 28, 2019   (KR) .......................... 10-2019-0023896

(51) Int. Cl.
*C09K 11/06*   (2006.01)
*C07F 5/02*    (2006.01)
(Continued)

(52) U.S. Cl.
CPC .............. *C09K 11/06* (2013.01); *C07F 5/027* (2013.01); *C09K 11/02* (2013.01); *G02B 6/005* (2013.01);
(Continued)

(58) Field of Classification Search
CPC . C09K 11/06; C09K 11/02; C09K 2211/1007; C09K 2211/1018;
(Continued)

(56) References Cited

U.S. PATENT DOCUMENTS 11,214,580 B2 *   1/2022   Moon ...................... G02B 5/23
2012/0037890 A1   2/2012   Okuda et al.
(Continued)

FOREIGN PATENT DOCUMENTS

CN    103429600 A    12/2013
CN    107531729 A     1/2018
(Continued)

OTHER PUBLICATIONS

International Search Report issued for International Application No. PCT/KR2020/002725 on Jun. 12, 2020, 5 pages.
(Continued)

*Primary Examiner* — Matthew E. Hoban
*Assistant Examiner* — Lynne Edmondson
(74) *Attorney, Agent, or Firm* — ROTHWELL, FIGG, ERNST & MANBECK, P.C.

(57) ABSTRACT

The present specification relates to a compound represented by Chemical Formula 1, and a color conversion film, a backlight unit and a display apparatus including the same.

15 Claims, 1 Drawing Sheet

(51) Int. Cl.
  *C09K 11/02* (2006.01)
  *F21V 8/00* (2006.01)
  *H01L 33/50* (2010.01)

(52) U.S. Cl.
  CPC ............... *C09K 2211/1007* (2013.01); *C09K 2211/1018* (2013.01); *C09K 2211/1022* (2013.01)

(58) Field of Classification Search
  CPC .......... C09K 2211/1022; H01L 33/502; H01L 33/503; H01L 33/504; C07F 5/02; C07F 5/027
  See application file for complete search history.

(56) References Cited

U.S. PATENT DOCUMENTS

| | | |
|---|---|---|
| 2014/0027685 A1 | 1/2014 | Ueda et al. |
| 2016/0190478 A1 | 6/2016 | Nakanotani et al. |
| 2016/0223162 A1 | 8/2016 | Shin et al. |
| 2017/0213974 A1 | 7/2017 | Adachi et al. |
| 2018/0138407 A1 | 5/2018 | Clark et al. |
| 2018/0208838 A1 | 7/2018 | Sakaino et al. |
| 2019/0093008 A1 | 3/2019 | Shin et al. |

FOREIGN PATENT DOCUMENTS

| | | |
|---|---|---|
| EP | 3465332 A | 4/2019 |
| JP | 2000-029213 A | 1/2000 |
| JP | 2010-059102 A | 3/2010 |
| JP | 6441896 B2 | 12/2018 |
| KR | 10-2011-0126637 A | 11/2011 |
| KR | 10-2017-0119200 A | 10/2017 |
| KR | 10-2018-0026340 A | 3/2018 |
| KR | 10-2018-0067515 A | 6/2018 |
| KR | 10-2019-0011762 A | 2/2019 |
| TW | 2016-43236 A | 12/2016 |
| WO | 20170210821 A1 | 12/2017 |

OTHER PUBLICATIONS

Yuan et al., "Spiro-BODIPYs with a Diaryl Chelate: Impact on Aggregation and Luminescence", J. Org. Chem., 2017, 82, 24, 13481-13487.

Bonnier et al., "Perfluoroaryl-Substituted Boron Dipyrrinato Complexes", Organometallics, vol. 28, No. 16, 2009, 4845-4851.

* cited by examiner

【FIG. 1】
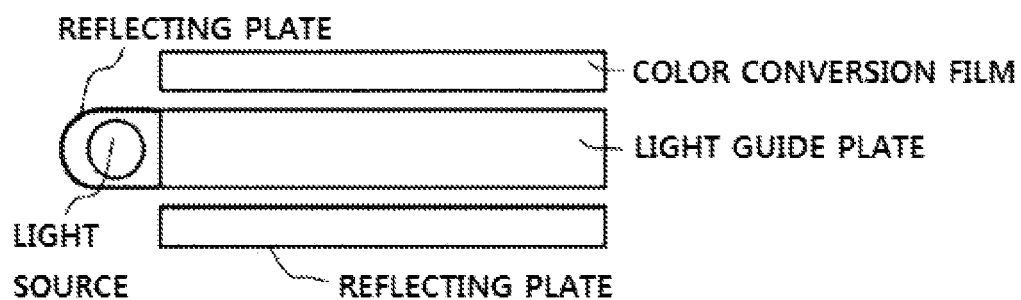
【FIG. 2】
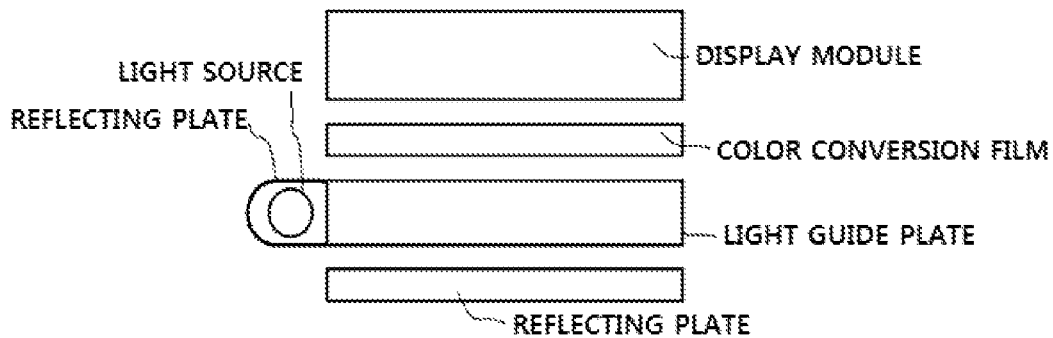

COMPOUND AND COLOR CONVERSION FILM COMPRISING SAME, BACKLIGHT UNIT, AND DISPLAY DEVICE

This application is a 35 U.S.C. 371 National Phase Entry Application from PCT/KR2020/002725 filed on Feb. 26, 2020, designating the United States, which claims priority to and the benefits of Korean Patent Application No. 10-2019-0023896, filed with the Korean Intellectual Property Office on Feb. 28, 2019, the entire contents of which are incorporated herein by reference.

TECHNICAL FIELD

The present specification relates to a compound, and a color conversion film, a backlight unit and a display apparatus including the same.

BACKGROUND OF THE INVENTION

Existing light emitting diodes (LED) are obtained by mixing a green phosphorescent substance and a red phosphorescent substance to a blue light emitting diode, or mixing a yellow phosphorescent substance and a blue-green phosphorescent substance to a UV light emitting diode. However, with such a method, it is difficult to control colors, and therefore, color rendering is not favorable. Accordingly, color gamut declines.

In order to overcome such color gamut decline and to reduce production costs, methods of obtaining green and red in a manner of filming quantum dots and binding the dots to a blue LED have been recently tried. However, cadmium series quantum dots have safety problems, and other quantum dots have significantly decreased efficiency compared to cadmium series quantum dots. In addition, quantum dots have reduced stability for oxygen and water, and have a disadvantage in that the performance is significantly degraded when aggregated. Furthermore, unit costs of production are high since, when producing quantum dots, maintaining the sizes to be constant is difficult.

Existing compounds having a $BF_2$ or $B(CN)_2$-based bodipy structure provides, as a fluorescent dye having high light efficiency and a narrow full width at half maximum, excellent light properties when used in a color conversion film, but has insufficient light resistance and heat resistance to be commercialized, and development of compounds having high durability has been required.

BRIEF SUMMARY OF THE INVENTION

The present specification is directed to providing a compound, and a color conversion film, a backlight unit and a display apparatus including the same.

One embodiment of the present disclosure provides a compound represented by the following Chemical Formula 1.

[Chemical Formula 1]

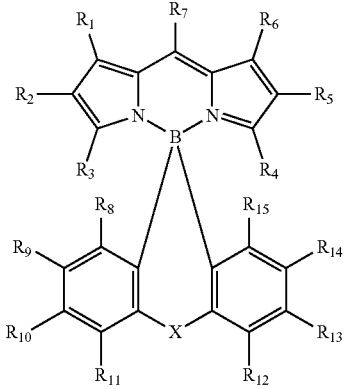

In Chemical Formula 1,

X is a direct bond; S; or O, $R_1$ and $R_6$ are the same as or different from each other, and each independently hydrogen; deuterium; a halogen group; a cyano group; a substituted or unsubstituted alkyl group; a substituted or unsubstituted cycloalkyl group; a substituted or unsubstituted aryl group; or a substituted or unsubstituted heteroaryl group, $R_3$ and $R_4$ are the same as or different from each other, and each independently a substituted or unsubstituted alkyl group; a substituted or unsubstituted cycloalkyl group; a substituted or unsubstituted aryl group; or a substituted or unsubstituted heteroaryl group, $R_2$ and $R_5$ are the same as or different from each other, and each independently hydrogen; deuterium; a halogen group; a cyano group; $-C(=O)OR_A$; $-OC(=O)R_B$; a substituted or unsubstituted aryl group; or a substituted or unsubstituted heteroaryl group, and when $R_1$, $R_3$, $R_4$ and $R_6$ are a methyl group, at least one of $R_2$ and $R_5$ is a halogen group; a cyano group; $-C(=O)OR_A$; $-OC(=O)R_B$; a substituted or unsubstituted aryl group; or a substituted or unsubstituted heteroaryl group, $R_7$ is a substituted or unsubstituted aryl group; a substituted or unsubstituted aryloxy group; a substituted or unsubstituted arylthioxy group; or a substituted or unsubstituted heteroaryl group, $R_8$, $R_{10}$ to $R_{13}$ and $R_{15}$ are the same as or different from each other, and each independently hydrogen; deuterium; or a halogen group, $R_9$ and $R_{14}$ are the same as or different from each other, and each independently hydrogen; deuterium; a halogen group; a cyano group; a nitro group; $-C(=O)OR_C$; $-OC(=O)R_D$; a substituted or unsubstituted alkyl group; a substituted or unsubstituted cycloalkyl group; a substituted or unsubstituted aryl group; or a substituted or unsubstituted heteroaryl group, and $R_A$ to $R_D$ are the same as or different from each other, and each independently a substituted or unsubstituted alkyl group; a substituted or unsubstituted aryl group; a substituted or unsubstituted heteroaryl group; or a substituted or unsubstituted coumarin group.

Another embodiment of the present specification provides a color conversion film including a resin matrix; and the compound represented by Chemical Formula 1 dispersed into the resin matrix.

Another embodiment of the present specification provides a backlight unit including the color conversion film.

Another embodiment of the present specification provides a display apparatus including the backlight unit.

ADVANTAGEOUS EFFECTS

A compound according to one embodiment of the present specification has more superior light resistance and heat resistance compared to existing compounds having a bodipy structure. Accordingly, by using the compound described in the present specification as a fluorescent material of a color conversion film, a color conversion film having excellent luminance and color gamut, and excellent durability can be provided.

BRIEF DESCRIPTION OF DRAWINGS

FIG. 1 is a mimetic diagram using a color conversion film according to one embodiment of the present specification in a backlight unit.

FIG. 2 is a mimetic diagram illustrating a structure of a display apparatus according to one embodiment of the present specification.

DETAILED DESCRIPTION OF THE INVENTION

Hereinafter, the present application will be described in more detail.

One embodiment of the present specification provides a compound represented by Chemical Formula 1.

In the present specification, a certain part "including" certain constituents means capable of further including other constituents, and does not exclude other constituents unless particularly stated on the contrary.

In the present specification, one member being placed "on" another member includes not only a case of the one member being in contact with the another member but a case of still another member being present between the two members.

In the present specification, an "adjacent" group may mean a substituent substituting an atom directly linked to an atom substituted by the corresponding substituent, a substituent sterically most closely positioned to the corresponding substituent, or another substituent substituting an atom substituted by the corresponding substituent. For example, two substituents substituting ortho positions in a benzene ring, and two substituents substituting the same carbon in an aliphatic ring may be interpreted as groups "adjacent" to each other.

Examples of substituents in the present specification are described below, however, the substituents are not limited thereto.

The term "substitution" means a hydrogen atom bonding to a carbon atom of a compound being changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of deuterium; a halogen group; a cyano group; a nitro group; —C(=O)R; —C(=O)OR'; —OC(=O)R"; an imide group; an amide group; a hydroxyl group; a substituted or unsubstituted amine group; a substituted or unsubstituted silyl group; a substituted or unsubstituted alkyl group; a substituted or unsubstituted cycloalkyl group; a substituted or unsubstituted haloalkyl group; a substituted or unsubstituted alkoxy group; a substituted or unsubstituted alkenyl group; a substituted or unsubstituted alkynyl group; a substituted or unsubstituted aryl group; a substituted or unsubstituted aryloxy group; a substituted or unsubstituted arylthioxy group; a substituted or unsubstituted heterocyclic group and a substituted or unsubstituted coumarin group, or being substituted with a substituent linking two or more substituents among the substituents illustrated above, or having no substituents, and R, R' and R" are each independently a substituted or unsubstituted alkyl group; a substituted or unsubstituted aryl group; a substituted or unsubstituted heteroaryl group; or a substituted or unsubstituted coumarin group.

In the present specification, examples of the halogen group may include fluorine, chlorine, bromine or iodine.

In the present specification, the number of carbon atoms of the imide group is not particularly limited, but is preferably from 1 to 30.

In the present specification, in the amide group, nitrogen of the amide group may be substituted with hydrogen, a linear, branched or cyclic alkyl group having 1 to 30 carbon atoms, or an aryl group having 6 to 30 carbon atoms.

In the present specification, the amine group may be selected from the group consisting of —NH$_2$; a monoalkylamine group; a dialkylamine group; an N-alkylamine group; a monoarylamine group; a diarylamine group; an N-arylheteroarylamine group; an N-alkylheteroarylamine group, a monoheteroarylamine group and a diheteroarylamine group, and, although not particularly limited thereto, the number of carbon atoms is preferably from 1 to 30.

In the present specification, the N-alkylarylamine group means an amine group in which N of the amine group is substituted with an alkyl group and an aryl group.

In the present specification, the N-arylheteroarylamine group means an amine group in which N of the amine group is substituted with an aryl group and a heteroaryl group.

In the present specification, the N-alkylheteroarylamine group means an amine group in which N of the amine group is substituted with an alkyl group and a heteroaryl group.

In the present specification, the alkyl group in the alkylamine group, the N-alkylarylamine group, the alkylthioxy group, the alkylsulfoxy group and the N-alkylheteroarylamine group is the same as the examples of the alkyl group described above.

In the present specification, specific examples of the silyl group may include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group and the like, but are not limited thereto.

In the present specification, the alkyl group may be linear or branched, and although not particularly limited thereto, the number of carbon atoms is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 4-methylhexyl, 5-methylhexyl and the like, but are not limited thereto.

In the present specification, the cycloalkyl group is not particularly limited, but preferably has 3 to 30 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the haloalkyl group represents an alkyl group in which a hydrogen atom of the alkyl group is replaced by the same or a different halogen group. The haloalkyl group may be linear or branched, and although not particularly limited thereto, the number of carbon atoms is preferably from 1 to 10. Specific examples thereof may include —$CH_2Cl$, —$CF_3$, —$CH_2CF_3$, —$CF_2CF_3$ and the like, but are not limited thereto.

In the present specification, the alkoxy group may be linear, branched or cyclic. The number of carbon atoms of the alkoxy group is not particularly limited, but is preferably from 1 to 30.

In the present specification, the alkenyl group may be linear or branched, and although not particularly limited thereto, the number of carbon atoms is preferably from 2 to 30.

In the present specification, the alkynyl group may be linear or branched, and although not particularly limited thereto, the number of carbon atoms is preferably from 2 to 30. Specific examples thereof may include alkynyl groups such as ethynyl, propynyl, 2-methyl-2-propynyl, 2-butynyl, 2-pentynyl and the like, but are not limited thereto.

In the present specification, the aryl group is not particularly limited, but preferably has 6 to 30 carbon atoms, and the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, the fluorenyl group may be substituted, and adjacent groups may bond to each other to form a ring.

When the fluorenyl group is substituted,

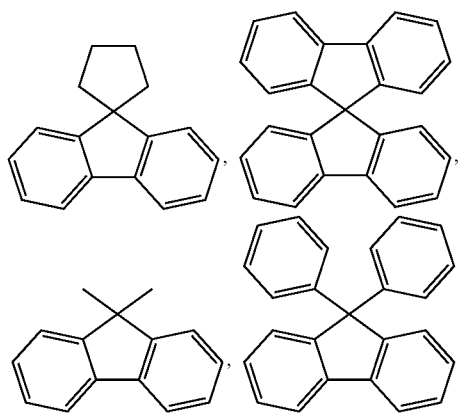

and the like may be included. However, the structure is not limited thereto.

In the present specification, the aryl group in the aryloxy group and the arylthioxy group is the same as the examples of the aryl group described above. Specific examples of the aryloxy group may include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group and the like, specific examples of the arylthioxy group may include a phenylthioxy group, a 2-methylphenylthioxy group, a 4-tert-butylphenylthioxy group and the like, however, the aryloxy group and the arylthioxy group are not limited thereto.

In the present specification, the heteroaryl group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heteroaryl group may be monocyclic or polycyclic. Examples of the heteroaryl group may include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group, a thiazolyl group, an isoxazolyl group, an oxadiazolyl group, a thiadiazolyl group, a phenothiazinyl group, a dibenzofuranyl group and the like, but are not limited thereto.

In the present specification, in the coumarin group, carbon of the coumarin group may be substituted with a halogen group; a nitrile group; a linear, branched or cyclic alkyl group having 1 to 25 carbon atoms; an amine group; a linear or branched alkoxy group having 1 to 25 carbon atoms; or an aryl group having 6 to 30 carbon atoms.

In one embodiment of the present specification, X is a direct bond; S; or O.

In one embodiment of the present specification, X is a direct bond.

In one embodiment of the present specification, X is S.

In one embodiment of the present specification, X is O.

In one embodiment of the present specification, $R_1$ and $R_6$ are the same as or different from each other, and each independently hydrogen; deuterium; a halogen group; a cyano group; a substituted or unsubstituted alkyl group; a substituted or unsubstituted cycloalkyl group; a substituted or unsubstituted aryl group; or a substituted or unsubstituted heteroaryl group.

In one embodiment of the present specification, $R_1$ and $R_6$ are the same as or different from each other, and each independently hydrogen; deuterium; a substituted or unsubstituted alkyl group; a substituted or unsubstituted cycloalkyl group; or a substituted or unsubstituted aryl group.

In one embodiment of the present specification, $R_1$ and $R_6$ are the same as or different from each other, and each independently hydrogen; deuterium; a substituted or unsubstituted C1 to C30 alkyl group; a substituted or unsubstituted C3 to C60 cycloalkyl group; or a substituted or unsubstituted C6 to C60 aryl group.

In one embodiment of the present specification, $R_1$ and $R_6$ are the same as or different from each other, and each independently hydrogen; deuterium; a substituted or unsubstituted C1 to C30 alkyl group; a substituted or unsubstituted C3 to C60 cycloalkyl group; or a substituted or unsubstituted C6 to C60 aryl group.

In one embodiment of the present specification, $R_1$ and $R_6$ are the same as or different from each other, and each independently hydrogen; deuterium; a substituted or unsubstituted C1 to C10 alkyl group; a substituted or unsubstituted C3 to C20 cycloalkyl group; or a substituted or unsubstituted C6 to C20 aryl group.

In one embodiment of the present specification, $R_1$ and $R_6$ are the same as or different from each other, and each independently hydrogen; deuterium; a substituted or unsubstituted methyl group; a substituted or unsubstituted cyclohexyl group; or a substituted or unsubstituted phenyl group.

In one embodiment of the present specification, $R_1$ and $R_6$ are the same as or different from each other, and each independently hydrogen; deuterium; a methyl group; a cyclohexyl group unsubstituted or substituted with an alkyl group; or a phenyl group.

In one embodiment of the present specification, $R_3$ and $R_4$ are the same as or different from each other, and each independently a substituted or unsubstituted alkyl group; a substituted or unsubstituted cycloalkyl group; a substituted or unsubstituted aryl group; or a substituted or unsubstituted heteroaryl group.

In one embodiment of the present specification, $R_3$ and $R_4$ are the same as or different from each other, and each independently a substituted or unsubstituted alkyl group; a cycloalkyl group unsubstituted or substituted with an alkyl group; an aryl group unsubstituted or substituted with one or more substituents selected form the group consisting of a halogen group, an alkyl group, an alkoxy group, a haloalkyl group, a cyano group and an aryl group; or a heteroaryl group unsubstituted or substituted with one or more substituents selected form the group consisting of an alkyl group and an alkoxy group.

In one embodiment of the present specification, $R_3$ and $R_4$ are the same as or different from each other, and each independently a substituted or unsubstituted C1 to C30 alkyl group; a C3 to C30 cycloalkyl group unsubstituted or substituted with an alkyl group; a C6 to C60 aryl group unsubstituted or substituted with one or more substituents selected form the group consisting of a halogen group, an alkyl group, an alkoxy group, a haloalkyl group, a cyano group and an aryl group; or a C2 to C60 heteroaryl group unsubstituted or substituted with one or more substituents selected form the group consisting of an alkyl group and an alkoxy group.

In one embodiment of the present specification, $R_3$ and $R_4$ are the same as or different from each other, and each independently a substituted or unsubstituted C1 to C15 alkyl group; a C3 to C20 cycloalkyl group unsubstituted or substituted with an alkyl group; a C6 to C30 aryl group unsubstituted or substituted with one or more substituents selected form the group consisting of a halogen group, an alkyl group, an alkoxy group, a haloalkyl group, a cyano group and an aryl group; or a C2 to C30 heteroaryl group unsubstituted or substituted with one or more substituents selected form the group consisting of an alkyl group and an alkoxy group.

In one embodiment of the present specification, $R_3$ and $R_4$ are the same as or different from each other, and each independently a substituted or unsubstituted methyl group; a cyclohexyl group unsubstituted or substituted with an alkyl group; or a phenyl group unsubstituted or substituted with one or more substituents selected form the group consisting of a halogen group, an alkyl group, an alkoxy group, a haloalkyl group, a cyano group and an aryl group.

In one embodiment of the present specification, $R_3$ and $R_4$ are the same as or different from each other, and each independently a methyl group; a cyclohexyl group unsubstituted or substituted with a methyl group; or a phenyl group unsubstituted or substituted with one or more substituents selected form the group consisting of an alkyl group and an alkoxy group.

In one embodiment of the present specification, $R_2$ and $R_5$ are the same as or different from each other, and each independently hydrogen; deuterium; a halogen group; a cyano group; $-C(=O)OR_A$; $-OC(=O)R_B$; a substituted or unsubstituted aryl group; or a substituted or unsubstituted heteroaryl group, and when $R_1$, $R_3$, $R_4$ and $R_6$ are a methyl group, at least one of $R_2$ and $R_5$ is a halogen group; a cyano group; $-C(=O)OR_A$; $-OC(=O)R_B$; a substituted or unsubstituted aryl group; or a substituted or unsubstituted heteroaryl group.

In one embodiment of the present specification, $R_2$ and $R_5$ are the same as or different from each other, and each independently hydrogen; deuterium; a halogen group; a cyano group; $-C(=O)OR_A$; $-OC(=O)R_B$; a substituted or unsubstituted C6 to C60 aryl group; or a substituted or unsubstituted C2 to C60 heteroaryl group, and when $R_1$, $R_3$, $R_4$ and $R_6$ are a methyl group, at least one of $R_2$ and $R_5$ is a halogen group; a cyano group; $-C(=O)OR_A$; $-OC(=O)R_B$; a substituted or unsubstituted C6 to C60 aryl group; or a substituted or unsubstituted C2 to C60 heteroaryl group.

In one embodiment of the present specification, $R_2$ and $R_5$ are the same as or different from each other, and each independently hydrogen; deuterium; a halogen group; a cyano group; $-C(=O)OR_A$; $-OC(=O)R_B$; a substituted or unsubstituted C6 to C30 aryl group; or a substituted or unsubstituted C2 to C30 heteroaryl group, and when $R_1$, $R_3$, $R_4$ and $R_6$ are a methyl group, at least one of $R_2$ and $R_5$ is a halogen group; a cyano group; $-C(=O)OR_A$; $-OC(=O)R_B$; a substituted or unsubstituted C6 to C30 aryl group; or a substituted or unsubstituted C2 to C30 heteroaryl group.

In one embodiment of the present specification, $R_2$ and $R_5$ are the same as or different from each other, and each independently hydrogen; deuterium; a halogen group; a cyano group; $-C(=O)OR_A$; $-OC(=O)R_B$; a substituted or unsubstituted C6 to C20 aryl group; or a substituted or unsubstituted C2 to C20 heteroaryl group, and when $R_1$, $R_3$, $R_4$ and $R_6$ are a methyl group, at least one of $R_2$ and $R_5$ is a halogen group; a cyano group; $-C(=O)OR_A$; $-OC(=O)R_B$; a substituted or unsubstituted C6 to C20 aryl group; or a substituted or unsubstituted C2 to C20 heteroaryl group.

In one embodiment of the present specification, $R_2$ and $R_5$ are the same as or different from each other, and each independently hydrogen; deuterium; a halogen group; a cyano group; $-C(=O)OR_A$; $-OC(=O)R_B$; an aryl group unsubstituted or substituted with one or more substituents selected form the group consisting of an alkyl group and a haloalkyl group; or a substituted or unsubstituted dibenzofuran group, and when $R_1$, $R_3$, $R_4$ and $R_6$ are a methyl group, at least one of $R_2$ and $R_5$ is a halogen group; a cyano group; $-C(=O)OR_A$; $-OC(=O)R_B$; a substituted or unsubstituted phenyl group; or a substituted or unsubstituted dibenzofuran group.

In one embodiment of the present specification, $R_2$ and $R_5$ are the same as or different from each other, and each independently hydrogen; deuterium; a halogen group; a cyano group; —C(=O)OR$_A$; —OC(=O)R$_B$; a phenyl group unsubstituted or substituted with one or more substituents selected form the group consisting of an alkyl group and a haloalkyl group; or a dibenzofuran group, and when $R_1$, $R_3$, $R_4$ and $R_6$ are a methyl group, at least one of $R_2$ and $R_5$ is a halogen group; a cyano group; —C(=O)OR$_A$; —OC(=O)R$_B$; a phenyl group unsubstituted or substituted with one or more substituents selected form the group consisting of an alkyl group and a haloalkyl group; or a dibenzofuran group.

In one embodiment of the present specification, $R_2$ and $R_5$ are the same as each other, and are hydrogen; deuterium; a halogen group; a cyano group; —C(=O)OR$_A$; —OC(=O)R$_B$; a phenyl group unsubstituted or substituted with one or more substituents selected form the group consisting of an alkyl group and a haloalkyl group; or a dibenzofuran group.

In one embodiment of the present specification, one of $R_2$ and $R_5$ is hydrogen, and the other one is a cyano group; —C(=O)OR$_A$; —OC(=O)R$_B$; or a substituted or unsubstituted alkyl group.

In one embodiment of the present specification, one of $R_2$ and $R_5$ is hydrogen, and the other one is a cyano group; —C(=O)OR$_A$; —OC(=O)R$_B$; or a substituted or unsubstituted methyl group.

In one embodiment of the present specification, one of $R_2$ and $R_5$ is hydrogen, and the other one is a cyano group; —C(=O)OR$_A$; —OC(=O)R$_B$; or a methyl group.

In one embodiment of the present specification, one of $R_2$ and $R_5$ is —C(=O)OR$_A$ or —OC(=O)R$_B$, and the other one is a substituted or unsubstituted aryl group.

In one embodiment of the present specification, one of $R_2$ and $R_5$ is —C(=O)OR$_A$ or —OC(=O)R$_B$, and the other one is an aryl group unsubstituted or substituted with a haloalkyl group.

In one embodiment of the present specification, one of $R_2$ and $R_5$ is —C(=O)OR$_A$ or —OC(=O)R$_B$, and the other one is a phenyl group unsubstituted or substituted with a haloalkyl group.

In one embodiment of the present specification, $R_A$ and $R_B$ are the same as or different from each other, and each independently a substituted or unsubstituted alkyl group; a substituted or unsubstituted aryl group; a substituted or unsubstituted heteroaryl group; or a substituted or unsubstituted coumarin group.

In one embodiment of the present specification, $R_A$ and $R_B$ are each independently a substituted or unsubstituted alkyl group; or a substituted or unsubstituted coumarin group.

In one embodiment of the present specification, $R_A$ and $R_B$ are each independently a substituted or unsubstituted alkyl group.

In one embodiment of the present specification, $R_A$ and $R_B$ are each independently an alkyl group unsubstituted or substituted with an alkoxy group substituted with a coumarin group.

In one embodiment of the present specification, $R_A$ and $R_B$ are each independently an alkyl group substituted with a coumarin group.

In one embodiment of the present specification, $R_A$ and $R_B$ are each independently a substituted or unsubstituted coumarin group.

In one embodiment of the present specification, $R_7$ is a substituted or unsubstituted aryl group; a substituted or unsubstituted aryloxy group; a substituted or unsubstituted arylthioxy group; or a substituted or unsubstituted heteroaryl group.

In one embodiment of the present specification, $R_7$ is a substituted or unsubstituted C6 to C30 aryl group; a substituted or unsubstituted C6 to C30 aryloxy group; a substituted or unsubstituted C6 to C30 arylthioxy group; or a substituted or unsubstituted C6 to C30 heteroaryl group.

In one embodiment of the present specification, $R_7$ is an aryl group unsubstituted or substituted with one or more substituents selected form the group consisting of an alkyl group, a halogen group, a haloalkyl group and an aryl group; or a substituted or unsubstituted dibenzofuran group.

In one embodiment of the present specification, $R_7$ is a phenyl group unsubstituted or substituted with one or more substituents selected form the group consisting of an alkyl group, a halogen group, a haloalkyl group and an aryl group; or a dibenzofuran group.

In one embodiment of the present specification, $R_8$, $R_{10}$ to $R_{13}$ and $R_{15}$ are the same as or different from each other, and each independently hydrogen; deuterium; or a halogen group.

In one embodiment of the present specification, $R_8$, $R_{10}$ to $R_{13}$ and $R_{15}$ are the same as each other, and are hydrogen; deuterium; or a halogen group.

In one embodiment of the present specification, $R_8$, $R_{10}$ to $R_{13}$ and $R_{15}$ are hydrogen.

In one embodiment of the present specification, $R_8$, $R_{10}$ to $R_{13}$ and $R_{15}$ are deuterium.

In one embodiment of the present specification, $R_8$, $R_{10}$ to $R_{13}$ and $R_{15}$ are a halogen group.

In one embodiment of the present specification, $R_8$, $R_{10}$ to $R_{13}$ and $R_{15}$ are a fluoro group.

In one embodiment of the present specification, $R_9$ and $R_{14}$ are the same as or different from each other, and each independently hydrogen; deuterium; a halogen group; a cyano group; a nitro group; —C(=O)OR$_C$; —OC(=O)R$_D$; a substituted or unsubstituted alkyl group; a substituted or unsubstituted cycloalkyl group; a substituted or unsubstituted aryl group; or a substituted or unsubstituted heteroaryl group.

In one embodiment of the present specification, $R_9$ and $R_{14}$ are the same as or different from each other, and each independently hydrogen; deuterium; a halogen group; a cyano group; a nitro group; —C(=O)OR$_C$; —OC(=O)R$_D$; a substituted or unsubstituted alkyl group; a substituted or unsubstituted cycloalkyl group; a substituted or unsubstituted aryl group; or a substituted or unsubstituted heteroaryl group.

In one embodiment of the present specification, $R_9$ and $R_{14}$ are the same as or different from each other, and each independently hydrogen; deuterium; a halogen group; a cyano group; or a substituted or unsubstituted alkyl group.

In one embodiment of the present specification, $R_9$ and $R_{14}$ are the same as or different from each other, and each independently hydrogen; deuterium; a halogen group; a cyano group; or a substituted or unsubstituted C1 to C20 alkyl group.

In one embodiment of the present specification, $R_9$ and $R_{14}$ are the same as or different from each other, and each independently hydrogen; deuterium; a halogen group; a cyano group; or a substituted or unsubstituted C1 to C10 alkyl group.

In one embodiment of the present specification, $R_C$ and $R_D$ are the same as or different from each other, and each independently a substituted or unsubstituted alkyl group; a substituted or unsubstituted aryl group; a substituted or unsubstituted heteroaryl group; or a substituted or unsubstituted coumarin group.
In one embodiment of the present specification, the compound represented by Chemical Formula 1 is represented by any one of the following compounds.
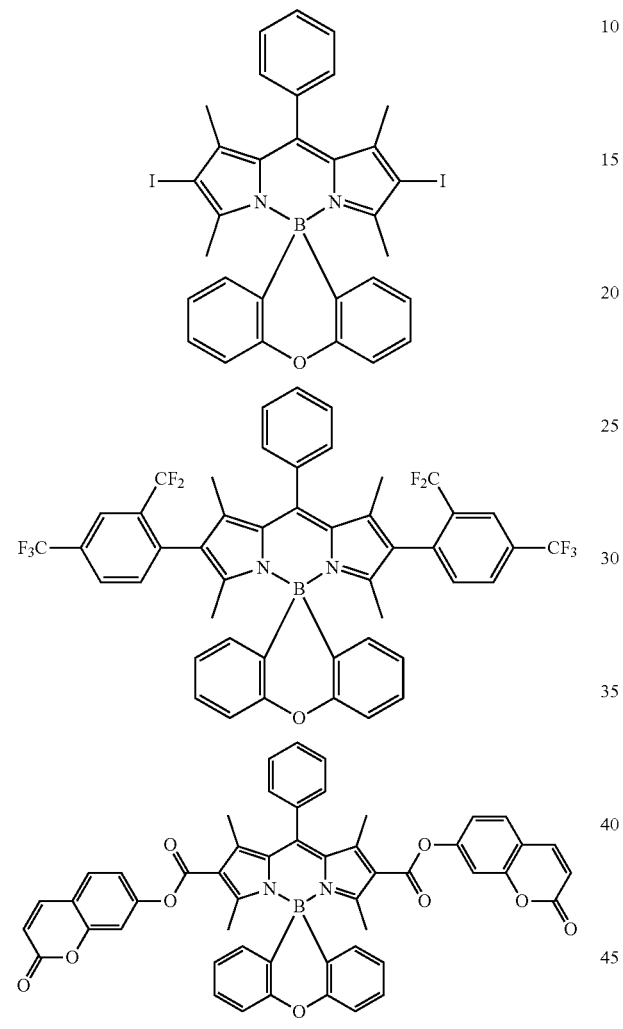
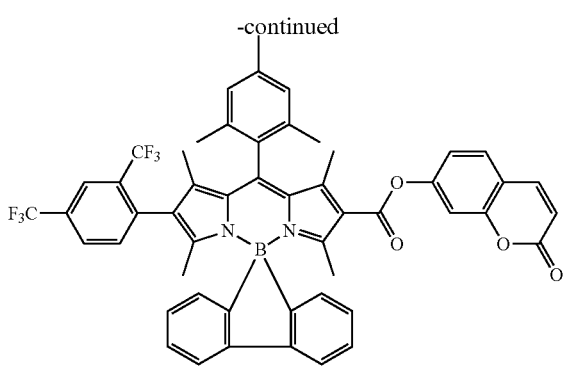
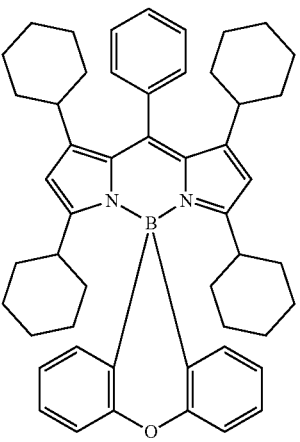
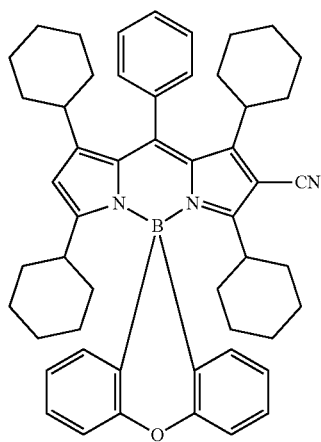

13
-continued
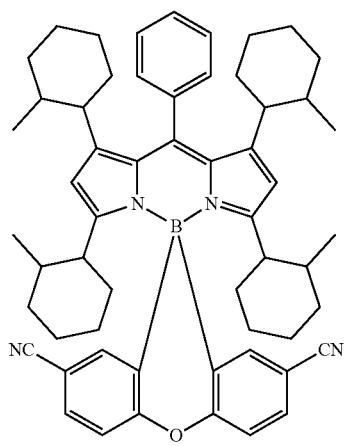
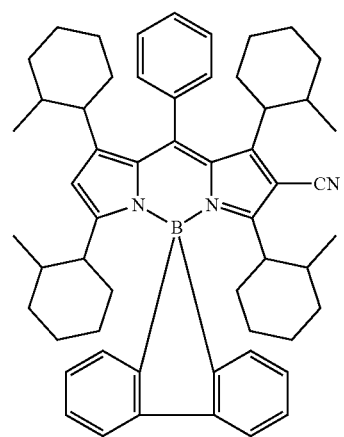
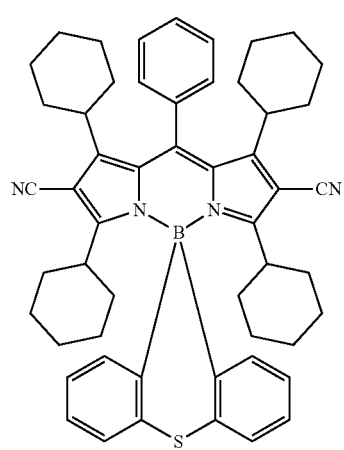
14
-continued
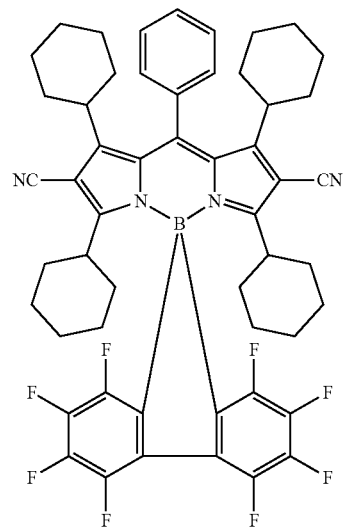
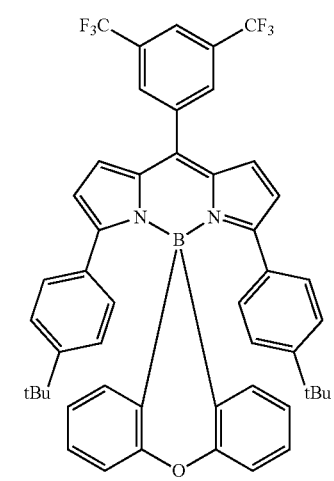
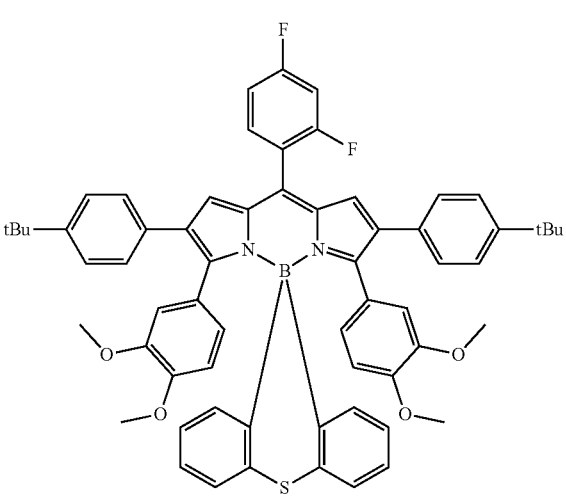

-continued

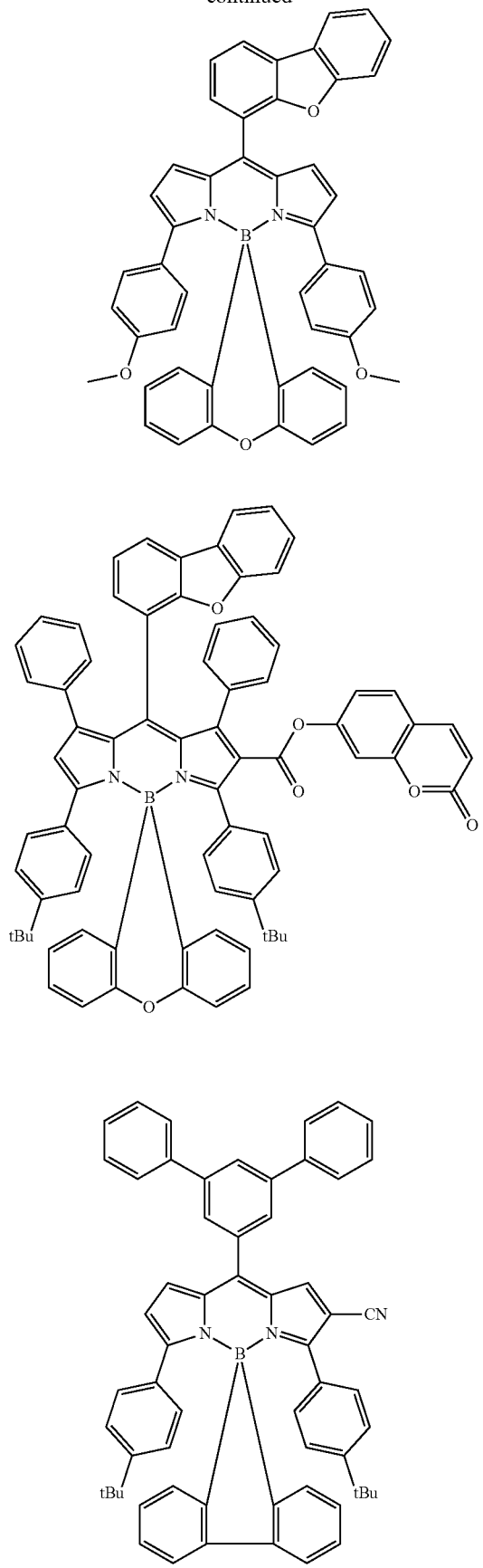

-continued

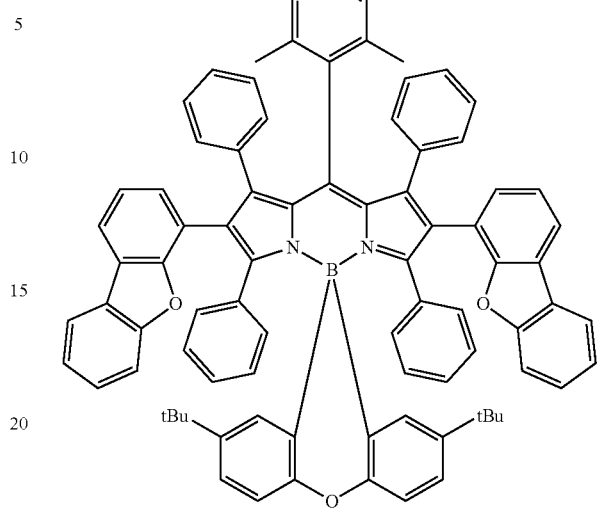

In the compounds, tBu is tert-butyl.

One embodiment of the present specification provides a color conversion film including a resin matrix; and the compound dispersed into the resin matrix.

According to one embodiment of the present specification, the compound of Chemical Formula 1 may be included in 0.01 parts by weight to 5 parts by weight, 0.01 parts by weight to 3 parts by weight, and 0.05 parts by weight to 1 parts by weight with respect to 100 parts by weight of the resin matrix.

When using a light source emitting light in a 430 nm to 470 nm region, the color conversion film according to the present specification has a maximum emission peak having a full width at half maximum of 50 nm or less in a 510 nm to 560 nm region. The light source may be, for example, a blue LED, but is not limited thereto. The full width at half maximum means, when converting light absorbed from an external light source to light having another wavelength and emitting the light, a width of the emission peak at half the maximum height in the maximum emission peak of the emitted light, and color gamut is excellent as the full width at half maximum is smaller.

The maximum emission peak and the full width at half maximum may be obtained by measuring a luminance spectrum using a spectroradiometer after laminating the color conversion film described above on one surface of a light guide plate of a backlight unit first, and laminating a prism sheet and a DBEF film on the color conversion film.

The content of the compound in the color conversion film may be in a range of 0.001% by weight to 15% by weight, and preferably in a range of 0.001% by weight to 10% by weight based on the total weight of the color conversion film. When the content of the compound is in the above-mentioned range, a color conversion film having a uniform composition may be prepared.

The color conversion film may include one type of the compound, or may include two or more types thereof. For example, the color conversion film may include one type of the compound emitting green light among the compounds represented by Chemical Formula 1. As another example, the color conversion film may include one type of the compound emitting red light among the compounds represented by Chemical Formula 1. As another example, the color conversion film may include one type of the compound emitting green light and one type of the compound emitting red light among the compounds represented by Chemical Formula 1.

The color conversion film may further include additional fluorescent materials in addition to the compound represented by Chemical Formula 1. When using a light source emitting blue light, the color conversion film preferably includes both a green light emitting fluorescent material and a red light emitting fluorescent material. In addition, when using a light source emitting blue light and green light, the color conversion film may only include a red light emitting fluorescent material. However, the color conversion film is not limited thereto, and even when using a light source emitting blue light, the color conversion film may only include a red light emitting compound when a separate film including a green light emitting fluorescent material is laminated. On the other hand, even when using a light source emitting blue light, the color conversion film may only include a green light emitting compound when a separate film including a red light emitting fluorescent material is laminated.

The color conversion film may further include an additional layer including a resin matrix; and a compound dispersed into the resin matrix and emitting light in a wavelength different from the wavelength of the compound represented by Chemical Formula 1. The compound emitting light in a wavelength different from the wavelength of the compound represented by Chemical Formula 1 may also be the compound represented by Chemical Formula 1, or may be other known fluorescent materials.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (PU)-based, a styrene-acrylonitrile (SAN)-based, a polyvinylidene fluoride (PVDF)-based, a modified polyvinylidene fluoride (modified-PVDF)-based and the like may be used as the resin matrix material.

According to one embodiment of the present specification, the color conversion film according to the embodiments described above additionally includes light diffusing particles. By dispersing light diffusing particles into the color conversion film instead of a light diffusing film used in the art for enhancing luminance, higher luminance may be exhibited compared to using a separate light diffusing film, and an adhering process may be skipped as well.

As the light diffusing particles, particles having a high refractive index with the resin matrix may be used, and examples thereof may include $TiO_2$, silica, borosilicate, alumina, sapphire, air or other air-filled hollow beads or particles (for example, air/gas-filled glass or polymers); polystyrene, polycarbonate, polymethyl methacrylate, acryl, methyl methacrylate, styrene, a melamine resin, a formaldehyde resin, or polymer particles including melamine and formaldehyde resins, or any suitable combination thereof.

The light diffusing particles may have particle diameters in a range of 0.1 μm to 5 μm, for example, in a range of 0.3 μm to 1 μm. The content of the light diffusing particles may be determined as necessary, and for example, may be in a range of approximately 1 part by weight to 30 parts by weight based on 100 parts by weight of the resin matrix.

The color conversion film according to the embodiments described above may have a thickness of 2 μm to 200 μm. Particularly, the color conversion film may exhibit high luminance even with a small thickness of 2 μm to 20 μm. This is due to the fact that the content of the fluorescent material molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, being transparent means having visible light transmittance of 70% or higher. For example, a PET film may be used as the substrate.

The color conversion film described above may be prepared by coating a resin solution in which the compound represented by Chemical Formula 1 described above is dissolved on a substrate and drying the result, or by extending and filming the compound represented by Chemical Formula 1 described above with a resin.

The compound represented by Chemical Formula 1 described above is dissolved in the resin solution, and therefore, the compound represented by Chemical Formula 1 is homogeneously distributed in the solution. This is different from a quantum dot film preparation process that requires a separate dispersion process.

As for the resin solution in which the compound represented by Chemical Formula 1 is dissolved, the preparation method is not particularly limited as long as the compound represented by Chemical Formula 1 described above and the resin are dissolved in the solution.

According to one example, the resin solution in which the compound represented by Chemical Formula 1 is dissolved may be prepared using a method of preparing a first solution by dissolving the compound represented by Chemical Formula 1 in a solvent, preparing a second solution by dissolving a resin in a solvent, and mixing the first solution and the second solution. When mixing the first solution and the second solution, it is preferred that these be homogeneously mixed. However, the method is not limited thereto, and a method of simultaneously adding and dissolving the compound represented by Chemical Formula 1 and a resin in a solvent, a method of dissolving the compound represented by Chemical Formula 1 in a solvent and subsequently adding and dissolving a resin, a method of dissolving a resin in a solvent and then subsequently adding and dissolving the compound represented by Chemical Formula 1, and the like, may be used.

As the resin included in the solution, the resin matrix material described above, a monomer curable to this resin matrix resin, or a mixture thereof, may be used. For example, the monomer curable to the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process.

Non-limiting examples of the solvent may include toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP) and the like, and one type or a mixture of two or more types may be used. When using the first solution and the second solution, solvents included in each of the solutions may be the same as or different from each other. Even when different types of solvents are used in the first solution and the second solution, these solvents preferably have compatibility so as to be mixed with each other.

The process of coating the resin solution in which the compound represented by Chemical Formula 1 is dissolved on a substrate may use a roll-to-roll process. For example, a process of unwinding a substrate from a substrate-wound roll, coating the resin solution in which the compound represented by Chemical Formula 1 is dissolved on one surface of the substrate, drying the result, and then winding the result again on the roll may be used. When a roll-to-roll process is used, viscosity of the resin solution is preferably determined in a range capable of conducting the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is conducted. The drying process may be conducted under a condition required to remove a solvent. For example, a color conversion film including a fluorescent material including the compound represented by Chemical Formula 1 having target thickness and concentration may be obtained on a substrate by carrying out the drying in an oven located close to a coater under a condition to sufficiently evaporate a solvent, in a direction of the substrate progressing during the coating process.

When a monomer curable to the resin matrix resin is used as the resin included in the solution, curing, for example, UV curing, may be conducted prior to or at the same time as the drying.

When the compound represented by Chemical Formula 1 is filmed by being extruded with a resin, extrusion methods known in the art may be used, and for example, the color conversion film may be prepared by extruding the compound represented by Chemical Formula 1 with a resin such as a polycarbonate (PC)-based, a poly(meth)acryl-based and a styrene-acrylonitrile (SAN)-based.

According to one embodiment of the present specification, the color conversion film may have a protective film or a barrier film provided on at least one surface. As the protective film or the barrier film, those known in the art may be used.

One embodiment of the present specification provides a backlight unit including the color conversion film including the compound represented by Chemical Formula 1. The backlight unit may have backlight unit constitutions known in the art except for including the color conversion film. FIG. 1 illustrates a mimetic diagram of a backlight unit structure according to one embodiment. According to FIG. 1, the color conversion film including the compound represented by Chemical Formula 1 is provided on a surface opposite to a surface facing a reflecting plate of a light guide plate. FIG. 1 illustrates a constitution including a light source and a reflecting plate surrounding the light source, however, the constitution is not limited to such a structure, and may vary depending on the backlight unit structure known in the art. In addition, as the light source, a direct type as well as a side chain type may be used, and the reflecting plate or the reflective layer may not be included or may be replaced with other constituents as necessary, and as necessary, additional films such as a light diffusing film, a light concentrating film and a luminance enhancing film may be further provided. Preferably, a prism sheet, a multilayer reflective polarizer film, a light concentrating film or a luminance enhancing film is further provided on the color conversion film.

In the constitution of the backlight unit as in FIG. 1, a scattering pattern may be provided as necessary on an upper surface or a lower surface of the light guide plate. Light introduced into the light guide plate has non-uniform light distribution due to repetition of optical processes such as reflection, total reflection, refraction or transmission, and the scattering pattern may be used to induce the non-uniform light distribution to uniform brightness.

One embodiment of the present specification provides a display apparatus including the backlight unit. The display apparatus is not particularly limited as long as it includes the backlight unit. For example, the display apparatus includes a display module and a backlight unit. FIG. 2 illustrates a structure of the display apparatus. However, the structure is not limited thereto, and between the display module and the backlight unit, additional films such as a light diffusing film, a light concentrating film and a luminance enhancing film may be further provided as necessary.

Hereinafter, the present specification will be described in detail with reference to examples. However, the examples according to the present specification may be modified to various other forms, and the scope of the present specification is not to be construed as being limited to the examples described below. Examples of the present specification are provided in order to more fully describe the present specification to those having average knowledge in the art.

Preparation Example 1

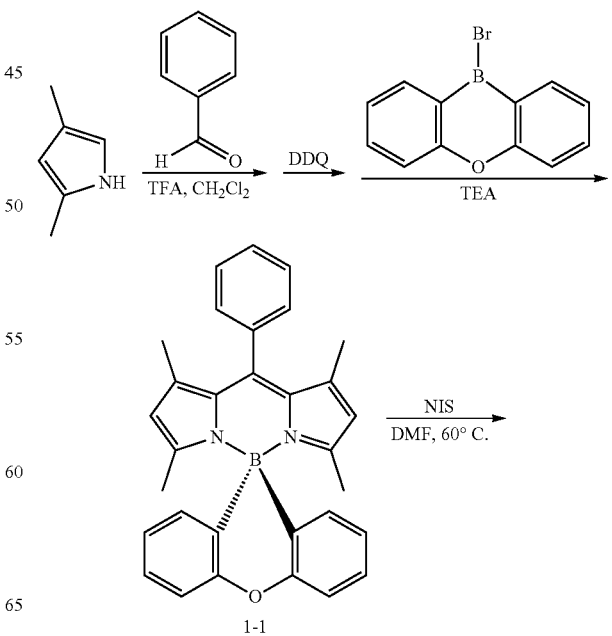

-continued

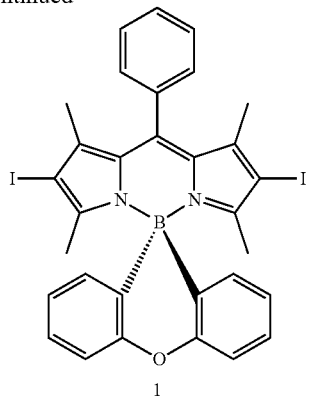

1

Preparation Example 2

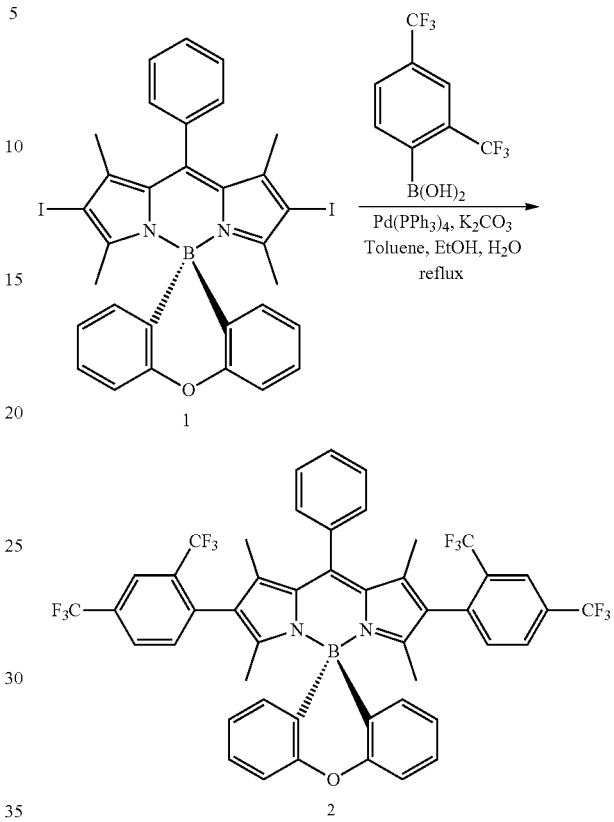

Synthesis of Compound 2

Compound 1 (2.5 g) and 2,4-bis(trifluoromethyl)phenylboronic acid (4.2 equivalents) were dissolved in a tetrahydrofuran solvent, and stirred together with potassium carbonate (10 equivalents) dissolved in water. The result was heated to 80° C., then tetrakis triphenylphosphine palladium (1.0 equivalents) was introduced thereto, and after the reaction was finished, the result was extracted using water and chloroform. The organic layer was dried using sodium sulfate, and purified to solids using methanol. Compound 2 (2.3 g, yield 74%) was obtained therethrough. (HR LC/MS/MS m/z calculated for $C_{47}H_{31}BF_{12}N_2O$ (M+): 878.2338; found: 878.2343)

Preparation Example 3

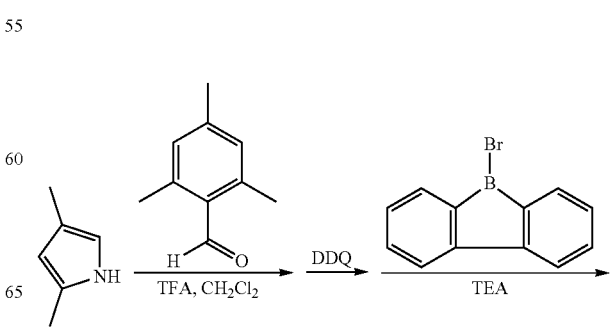

Synthesis of Compound 1-1

After mixing 2,4-dimethylpyrrole (10 g), benzaldehyde (0.52 equivalents)), trifluoroacetic acid (2 drops) and dry dichloromethane (500 mL) in a flask, the mixture was stirred for 5 hours at room temperature under nitrogen. After identifying that the starting materials disappeared using TLC, 2,3-dichloro-5,6-dicyano-1,4-benzoquinone (DDQ) (0.52 equivalents) was added thereto at 0° C. After stirring the result for 1 hour at room temperature, triethylamine (2.5 equivalents) was slowly added dropwise thereto. The result was stirred for 30 minutes at room temperature, and then 10-bromo-9-oxa-10-borane anthracene (4.6 equivalents) was slowly added dropwise thereto. The reaction material was stirred for 5 hours at room temperature, and, after introducing water thereto, extracted with dichloromethane. The result was dried with anhydrous magnesium sulfate, then filtered, and vacuum distilled to remove the solvent. The result was passed through a silica gel column (hexane/ethyl acetate) to obtain Compound 1-1 (13.5 g, yield 57%).

Synthesis of Compound 1

After dissolving Compound 1-1 (3.5 g) in dimethylformamide, N-iodosuccinimide (NIS) (6 equivalents) was slowly introduced thereto at room temperature. The result was stirred while heating at 60° C. to progress a reaction, and after the reaction was finished, the result was extracted using a sodium thiosulfate solution and dichloromethane. The organic layer was dried using sodium sulfate, and purified to solids using methanol. Compound 1 (4.5 g, yield 83%) was obtained therethrough. (HR LC/MS/MS m/z calculated for $C_{31}H_{25}BI_2N_2O$ (M+): 706.0149; found: 706.0141)

-continued

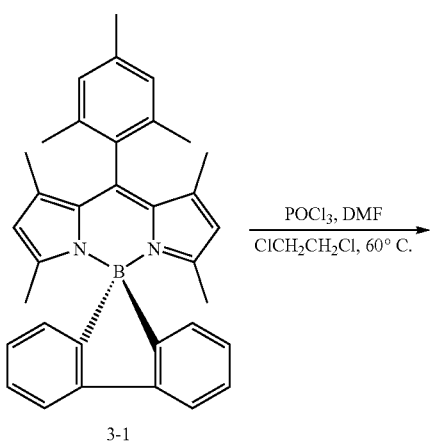
3-1

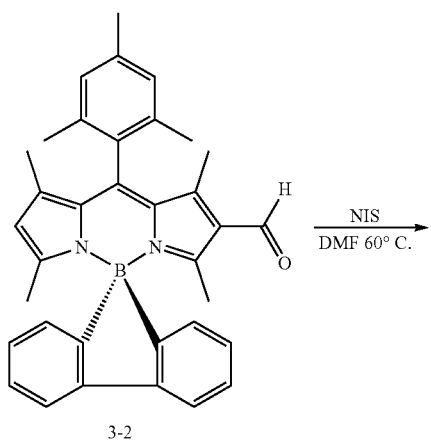
3-2

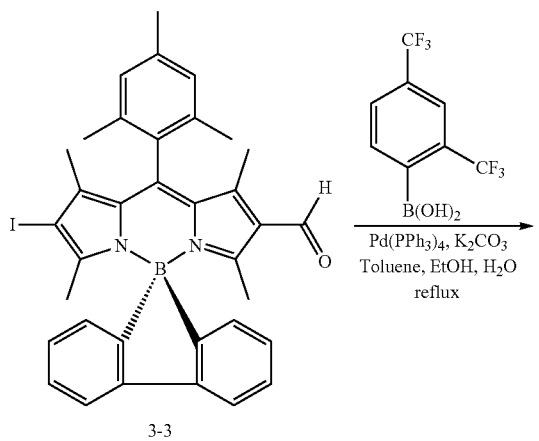
3-3

-continued

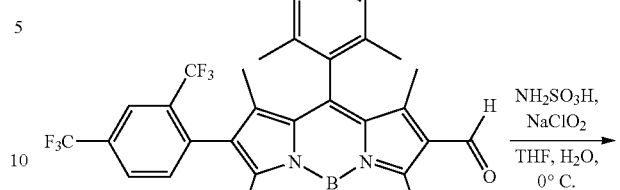
3-4

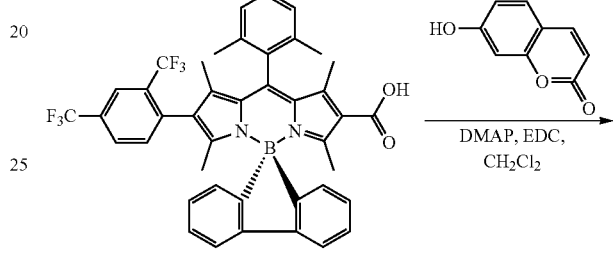
3-5

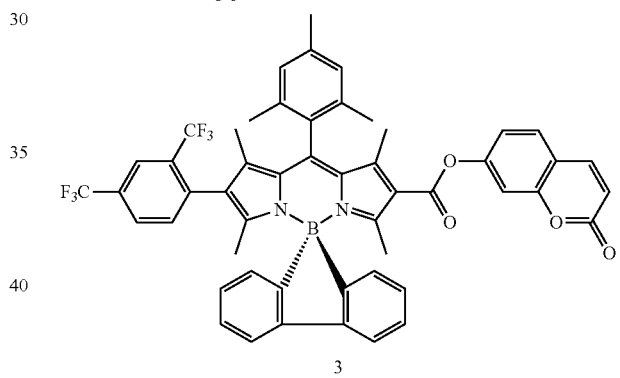
3

Synthesis of Compound 3-1

Synthesis was conducted in the same manner as in Synthesis of Compound 1-1 except that mesityl aldehyde was used instead of benzaldehyde, and 5-bromo-5H-dibenzoborole was used instead of 10-bromo-9-oxa-10-borane anthracene. Compound 3-1 (9.5 g, yield 40%) was obtained therethrough.

Synthesis of Compound 3-2

After mixing dimethylformamide (4 mL) and dichloroethane (50 mL) in a flask, the temperature was lowered to 0° C. Under the nitrogen atmosphere, POCl₃ (4 mL) was slowly added dropwise thereto, and the result was stirred for 30 minutes at room temperature. Compound 3-1 (3.9 g) was added to the reaction solution, and the result was stirred for 1 hour after raising the temperature to 60° C. The result was cooled to room temperature, and then introduced to a mixed solution of ice and a saturated aqueous sodium hydroxide solution. The result was stirred for 2 hours at room temperature, and then extracted with chloroform. The result was dried with anhydrous magnesium sulfate, then filtered, and vacuum distilled to remove the solvent. The result was passed through a silica gel column (hexane/ethyl acetate) to obtain Compound 3-2 (2.8 g, yield 66%).

Synthesis of Compound 3-3

After dissolving Compound 3-2 (2.7 g) and N-iodosuccinimide (NIS) (3 equivalents) in dimethylformamide in a flask, the result was stirred for 5 hours at 60° C. The result was cooled to room temperature, and water was introduced thereto to filter solids. The solids were dissolved in chloroform, and washed with a saturated sodium thiosulfate solution. The result was dried with anhydrous magnesium sulfate and then silica filtered. The result was vacuum distilled to remove the solvent, and then passed through a silica gel column (hexane/ethyl acetate) to obtain Compound 3-3 (2.9 g, yield 86%).

Synthesis of Compound 3-4

After dissolving Compound 3-3 (2.7 g) and 2,4-bis(trifluoromethyl)phenylboronic acid (2.1 equivalents) in toluene and ethanol, potassium carbonate (3.0 equivalents) was added to the reaction solution together with water, and the result was stirred. After heating to 80° C., tetrakis triphenylphosphine palladium (1.0 equivalents) was introduced thereto, and when the reaction was finished, the result was extracted using water and chloroform. The organic layer was dried using sodium sulfate, and purified to solids using methanol. Compound 3-4 (2.6 g, yield 85%) was obtained therethrough.

Synthesis of Compound 3-5

After dissolving Compound 3-4 (2.5 g) and amidosulfonic acid (1 equivalents) in tetrahydrofuran, sodium chlorite (1 equivalents) dissolved in water was slowly added dropwise thereto. The result was stirred for 1 hour at 0° C., and, when the reaction was finished, extracted with chloroform using a saturated sodium thiosulfate solution. The organic layer was dried using sodium sulfate. The solvent was removed to obtain Compound 3-5 (2.3 g, yield 90%).

Synthesis of Compound 3

Compound 3-5 (2.2 g), 7-hydroxyl coumarin (1.2 equivalents), 4-dimethylaminopyridine (DMAP) (0.2 equivalents) and N-ethyl-N'-(3-dimethylaminopropyl)carbodiimide (EDC)-HCl (1.2 equivalents) were introduced to dichloromethane, and stirred while heating. After the reaction was finished, the result was cooled to room temperature, and extracted after introducing water thereto. The organic layer was dried using sodium sulfate, and the solvent was evaporated. The result was passed through a silica gel column (hexane/ethyl acetate) to obtain Compound 3 (2.2 g, yield 84%). (HR LC/MS/MS m/z calculated for $C_{52}H_{39}BF_6N_2O_4$ (M+): 880.2907; found: 880.2901)

Preparation Example 4

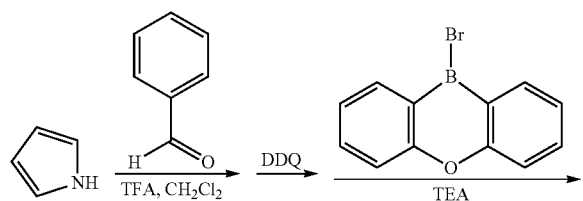

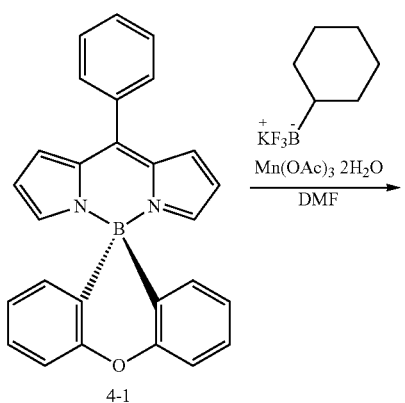

4-1

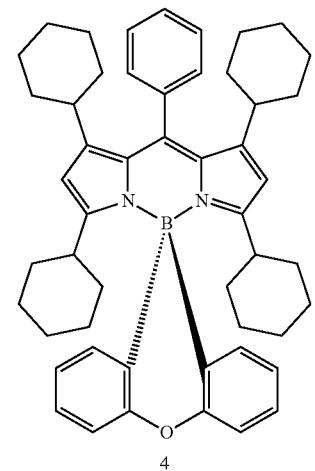

4

Synthesis of Compound 4-1

Synthesis was conducted in the same manner as in Synthesis of Compound 1-1 except that pyrrole was used instead of 2,4-dimethylpyrrole. Compound 4-1 (13.1 g, yield 44%) was obtained therethrough.

Synthesis of Compound 4

Compound 4-1 (3.0 g), cyclohexyl trifluoroborate potassium salt (5 equivalents) and manganese acetate hydrate (10 equivalents) were introduced to a dimethylformamide solvent, and heated to 80° C. or less. When the reaction was finished, the result was cooled to room temperature, and, after introducing water thereto, filtered with a celite pad. The celite pad was dissolved again in tetrahydrofuran, then dried by introducing sodium sulfate thereto, and then filtered. The result was vacuumed to remove the solvent, and purified to solids using methanol. Compound 4 (3.2 g, yield 58%) was obtained therethrough. (HR LC/MS/MS m/z calculated for $C_{51}H_{59}BN_2O$ (M+): 726.4720; found: 751.4713)

Preparation Example 5

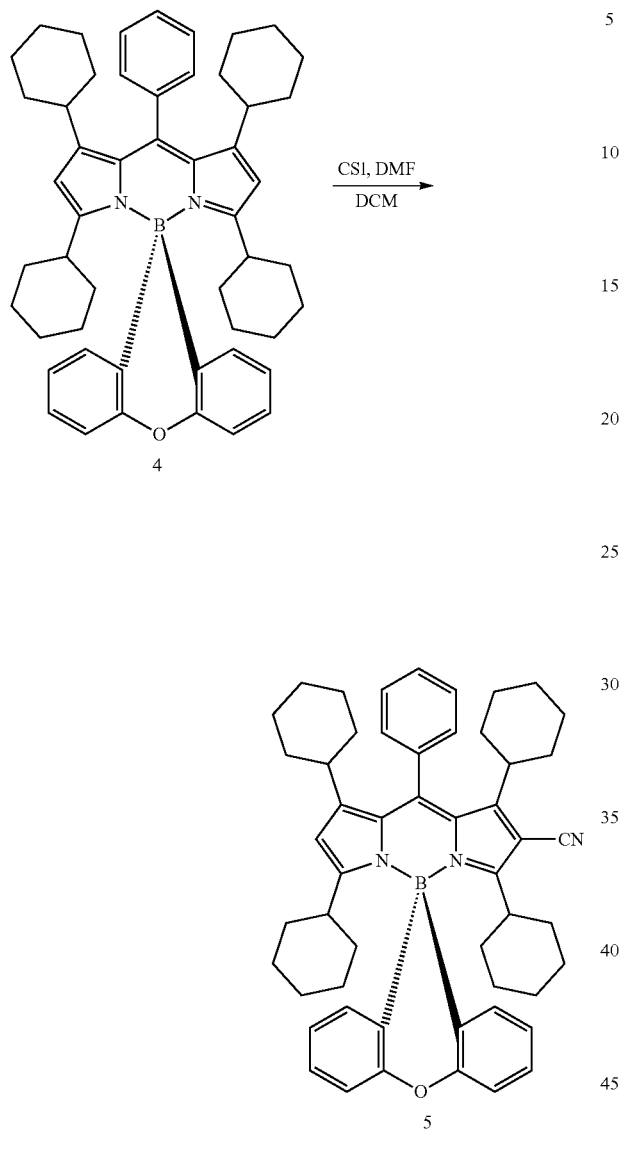

Synthesis of Compound 5

After dissolving Compound 4 (3.0 g) in a dichloromethane solvent, chlorosulfonyl isocyanate (3 equivalents) was introduced thereto. The reaction was progressed at room temperature, and the reaction was identified after taking out a small amount and mixing with dimethylformamide. When the reaction was finished, dimethylformamide (10 equivalents) was introduced thereto, and the result was stirred for approximately 3 hours. The result was extracted using water and chloroform, and then the organic layer was dried using sodium sulfate and purified to solids using methanol. Compound 5 (2.9 g, yield 93%) was obtained therethrough. (HR LC/MS/MS m/z calculated for $C_{52}H_{58}BN_3O$ (M+): 751.4673; found: 751.4678)

Preparation Example 6

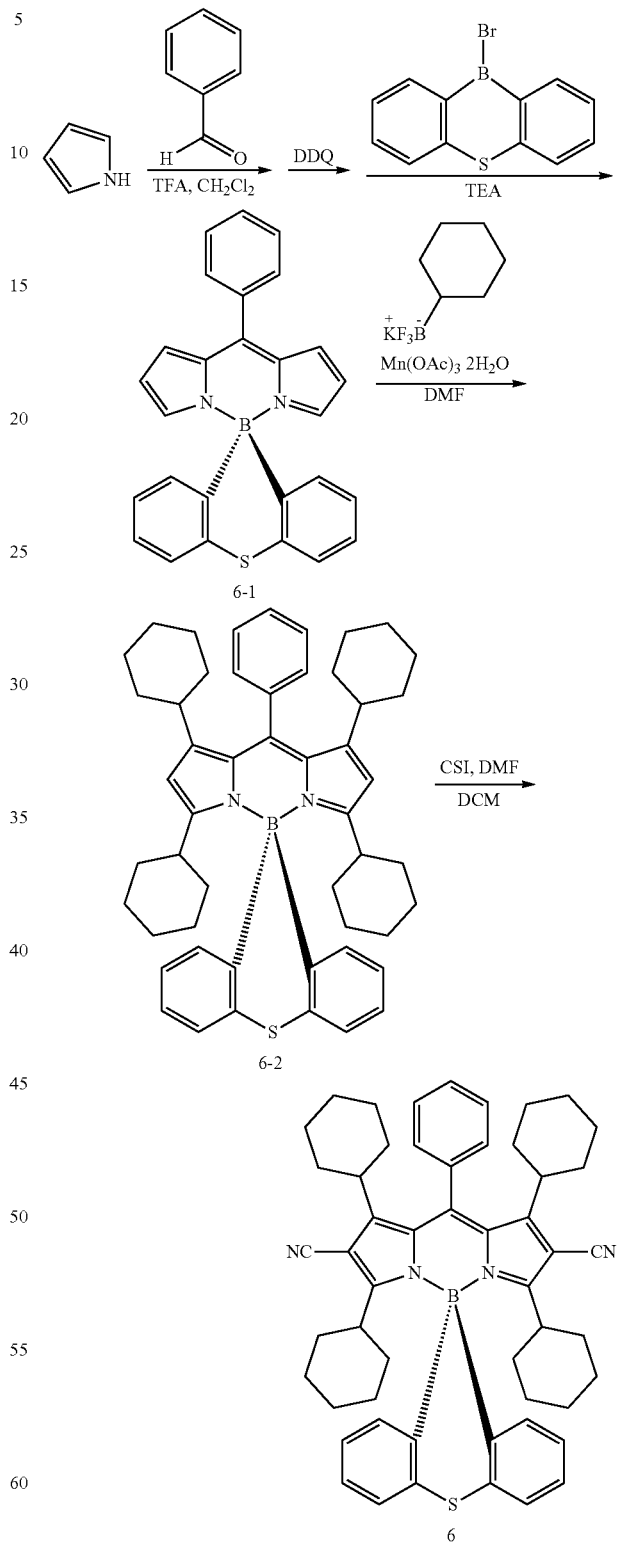

Synthesis of Compound 6-1

Synthesis was conducted in the same manner as in Synthesis of Compound 1-1 except that pyrrole was used instead of 2,4-dimethylpyrrole, and 10-bromo-9-thia-10-borane anthracene was used instead of 10-bromo-9-oxa-10-borane anthracene. Compound 6-1 (14.1 g, yield 46%) was obtained therethrough.

Synthesis of Compound 6-2

Synthesis was conducted in the same manner as in Synthesis of Compound 4 except that Compound 6-1 was used instead of Compound 4-1. Compound 6-2 (3.2 g, yield 59%) was obtained therethrough.

Synthesis of Compound 6

After dissolving Compound 6-2 (3.0 g) in a dichloromethane solvent, chlorosulfonyl isocyanate (10 equivalents) was introduced thereto. The result was heated to 60° C. or less, and the reaction was identified after taking out a small amount and mixing with dimethylformamide. When the reaction was finished, dimethylformamide (30 equivalents) was introduced thereto, and the result was stirred for approximately 3 hours. The result was extracted using water and chloroform, and then the organic layer was dried using sodium sulfate and purified to solids using methanol. Compound 6 (2.8 g, yield 87%) was obtained. (HR LC/MS/MS m/z calculated for $C_{53}H_{57}BN_4S$ (M+): 792.4397; found: 700.2401)

Preparation Example 7

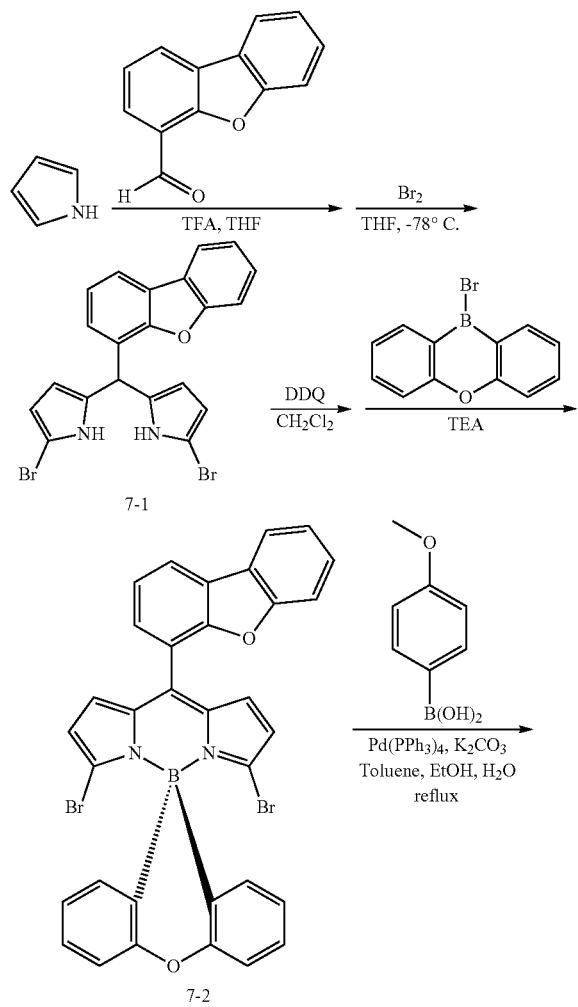

7-1

7-2

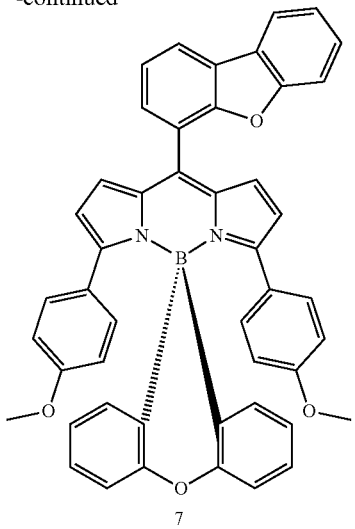

7

Synthesis of Compound 7-1

After mixing pyrrole (10 g), dibenzofuran aldehyde (0.52 equivalents), trifluoroacetic acid (2 drops) and dry tetrahydrofuran (100 mL) in a flask, the mixture was stirred for 5 hours at room temperature under nitrogen. After identifying that the starting materials disappeared using TLC, bromine (1.0 equivalents) was added thereto at −78° C. After the reaction was completed, triethylamine (3 equivalents) and ethanol were introduced thereto, and the result was thoroughly stirred. Solids produced herein were filtered to obtain Compound 7-1 (15.4 g, 44%).

Synthesis of Compound 7-2

Compound 7-1 (15.4 g) was dissolved in dichloromethane, and 2,3-dichloro-5,6-dicyano-1,4-benzoquinone (DDQ) (1.0 equivalents) was added thereto at 0° C. The result was stirred for 1 hour at room temperature, and then triethylamine (2.0 equivalents) was slowly added dropwise thereto. After stirring the result for 30 minutes at room temperature, 10-bromo-9-oxa-10-borane anthracene (4.0 equivalents) was slowly added dropwise thereto. The reaction material was stirred for 5 hours at room temperature, and, after introducing water thereto, extracted with dichloromethane. The result was dried with anhydrous magnesium sulfate, then filtered, and vacuum distilled to remove the solvent. The result was passed through a silica gel column (hexane/ethyl acetate) to obtain Compound 7-2 (13.5 g, yield 64%).

Synthesis of Compound 7

Compound 7-2 (3.0 g) and 4-methoxyphenylboronic acid (4.2 equivalents) were dissolved in a tetrahydrofuran solvent, and stirred together with potassium carbonate (10 equivalents) dissolved in water. The result was heated to 80° C., then tetrakis triphenylphosphine palladium (1.0 equivalents) was introduced thereto, and when the reaction was finished, the result was extracted using water and chloroform. The organic layer was dried using sodium sulfate, and purified to solids using methanol. Compound 7 (2.4 g, yield 74%) was obtained therethrough. (HR LC/MS/MS m/z calculated for $C_{47}H_{33}BN_2O_4$ (M+): 700.2533; found: 700.2528)

Preparation Example 8
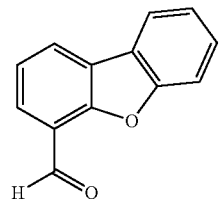
+
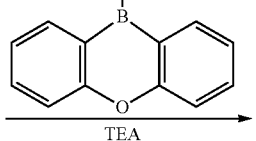
1. TFA
2. DDQ
CH$_2$Cl$_2$
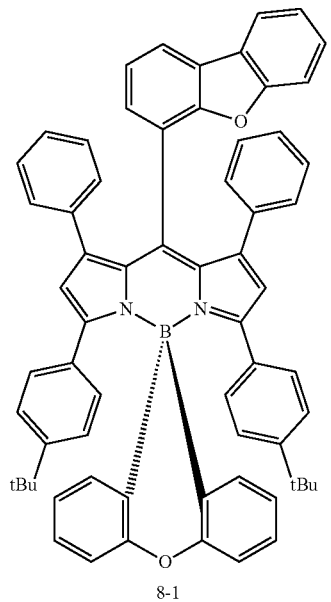
8-1
POCl$_3$, DMF
ClCH$_2$CH$_2$Cl, 60° C.
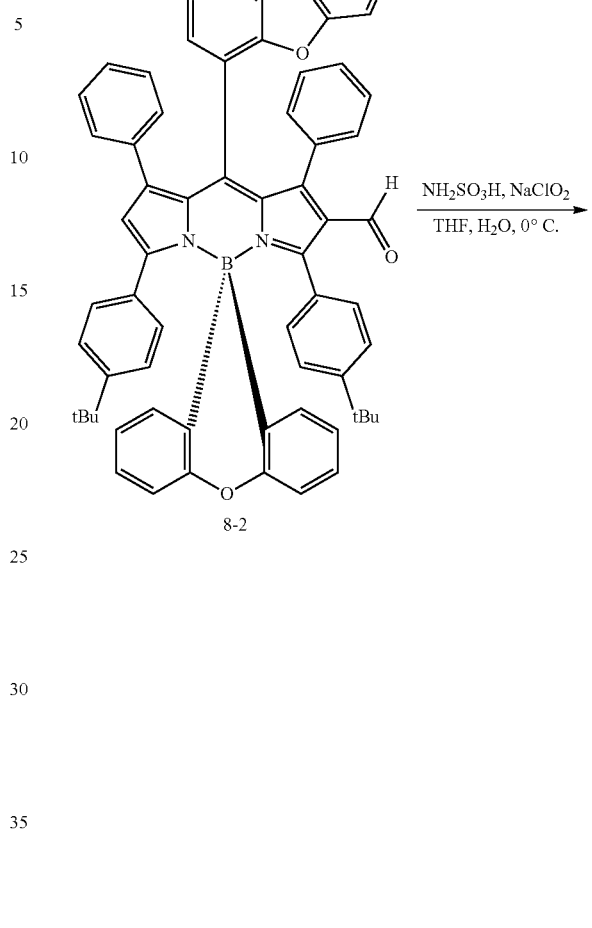
8-2
NH$_2$SO$_3$H, NaClO$_2$
THF, H$_2$O, 0° C.
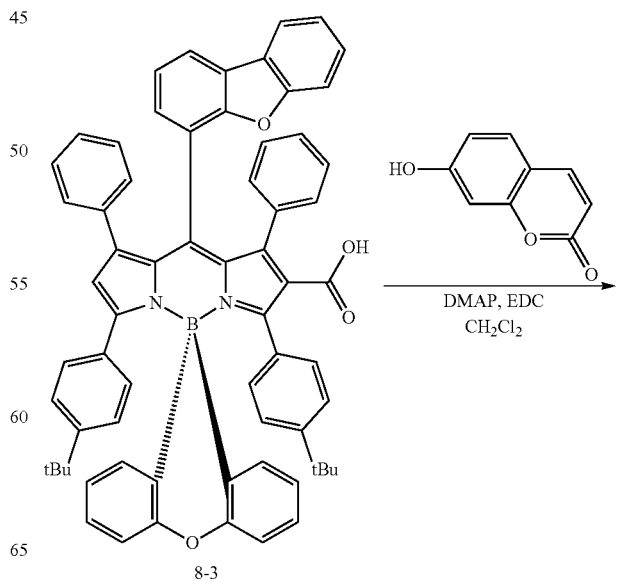
8-3
DMAP, EDC
CH$_2$Cl$_2$

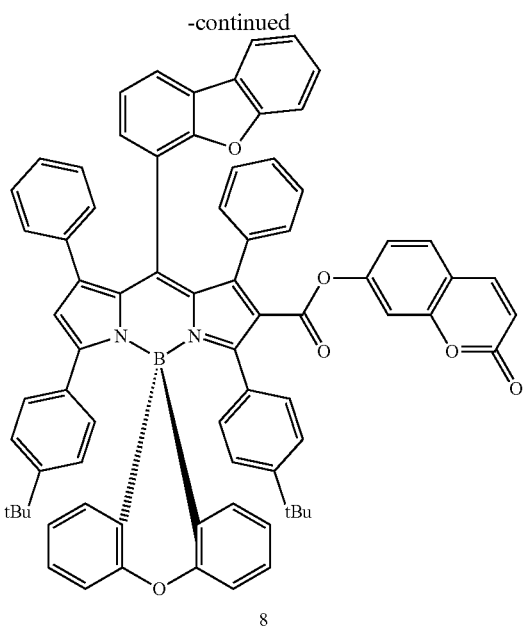

8

Synthesis of Compound 8-1

Synthesis was conducted in the same manner as in Synthesis of Compound 1-1 except that 2-(4-(t-butyl)phenyl)-4-phenyl-1H-pyrrole was used instead of 2,4-dimethylpyrrole, and dibenzofuran aldehyde was used instead of benzaldehyde. Compound 8-1 (19.6 g, yield 60%) was obtained therethrough.

Synthesis of Compound 8-2

Synthesis was conducted in the same manner as in Synthesis of Compound 3-2 except that Compound 8-1 was used instead of Compound 3-1. Compound 8-2 (2.8 g, yield 91%) was obtained through a silica gel column (hexane/ethyl acetate).

Synthesis of Compound 8-3

Synthesis was conducted in the same manner as in Synthesis of Compound 3-5 except that Compound 8-2 was used instead of Compound 3-4. Compound 8-3 (2.6 g, yield 91%) was obtained therethrough.

Synthesis of Compound 8

Synthesis was conducted in the same manner as in Synthesis of Compound 3 except that Compound 8-3 was used instead of Compound 3-5. Compound 8 (2.3 g, yield 77%) was obtained through a silica gel column (hexane/ethyl acetate). (HR LC/MS/MS m/z calculated for $C_{75}H_{57}BN_2O_6$ (M+): 1092.4310; found: 1092.4295)

Example 1

A first solution was prepared by dissolving Compound 1 (maximum absorption wavelength 515 nm, maximum emission wavelength 531 nm, full width at half maximum 38 nm in toluene solution), an organic fluorescent substance, in a xylene solvent.

A second solution was prepared by dissolving a thermoplastic resin SAN (styrene-acrylonitrile-based) in a xylene solvent. The first solution and the second solution were homogeneously mixed so that the amount of the organic fluorescent substance was 0.5 parts by weight based on 100 parts by weight of the SAN. The solid content in the mixed solution was 20% by weight and viscosity was 200 cps. This solution was coated on a PET substrate, and the result was dried to prepare a color conversion film.

A luminance spectrum of the prepared color conversion film was measured using a spectroradiometer (SR series of TOPCON Corporation). Specifically, the prepared color conversion film was laminated on one surface of a light guide plate of a backlight unit including an LED blue backlight (maximum emission wavelength 450 nm) and the light guide plate, and after laminating a prism sheet and a DBEF film on the color conversion film, a luminance spectrum of the film was measured. When measuring the luminance spectrum, an initial value was set so that the brightness of the blue LED light was 600 nit based on without the color conversion film.

Example 2

An experiment was performed in the same manner as in Example 1 except that Compound 2 (maximum absorption wavelength 508 nm, maximum emission wavelength 517 nm, full width at half maximum 31 nm in toluene solution) was used instead of Compound 1.

Example 3

An experiment was performed in the same manner as in Example 1 except that Compound 3 (maximum absorption wavelength 513 nm, maximum emission wavelength 521 nm, full width at half maximum 34 nm in toluene solution) was used instead of Compound 1.

Example 4

An experiment was performed in the same manner as in Example 1 except that Compound 4 (maximum absorption wavelength 503 nm, maximum emission wavelength 515 nm, full width at half maximum 32 nm in toluene solution) was used instead of Compound 1.

Example 5

An experiment was performed in the same manner as in Example 1 except that Compound 5 (maximum absorption wavelength 498 nm, maximum emission wavelength 513 nm, full width at half maximum 32 nm in toluene solution) was used instead of Compound 1.

Example 6

An experiment was performed in the same manner as in Example 1 except that Compound 6 (maximum absorption wavelength 501 nm, maximum emission wavelength 512 nm, full width at half maximum 34 nm in toluene solution) was used instead of Compound 1.

Example 7

An experiment was performed in the same manner as in Example 1 except that Compound 7 (maximum absorption wavelength 594 nm, maximum emission wavelength 634 nm, full width at half maximum 38 nm in toluene solution) was used instead of Compound 1.

Example 8

An experiment was performed in the same manner as in Example 1 except that Compound 8 (maximum absorption wavelength 598 nm, maximum emission wavelength 636 nm, full width at half maximum 47 nm in toluene solution) was used instead of Compound 1.

Comparative Example 1

An experiment was performed in the same manner as in Example 1 except that the following mPhBODIPY (maximum absorption wavelength 503 nm, maximum emission wavelength 516 nm, full width at half maximum 26 nm in toluene solution) was used instead of Compound 1.

Comparative Example 2

An experiment was performed in the same manner as in Example 1 except that the following pPhBODIPY (maximum absorption wavelength 570 nm, maximum emission wavelength 613 nm, full width at half maximum 42 nm in toluene solution) was used instead of Compound 1.

Comparative Example 3

An experiment was performed in the same manner as in Example 1 except that the following spiro-BODIPY (maximum absorption wavelength 505 nm, maximum emission wavelength 512 nm, full width at half maximum 25 nm in toluene solution) was used instead of Compound 1.

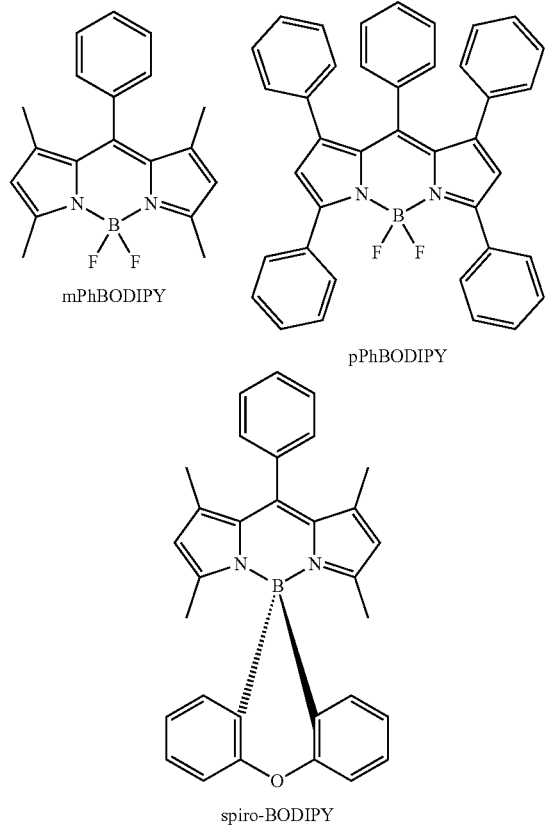

mPhBODIPY pPhBODIPY spiro-BODIPY

Film emission wavelength (maximum emission wavelength and full width at half maximum), quantum yield and Abs intensity (absorption intensity) of the color conversion films according to Examples 1 to 8 and Comparative Examples 1 to 3 are as shown in the following Table 1.

TABLE 1

|  |  | Film Emission Wavelength | | Quantum Yield (%) | Abs Intensity (1000 hr, %) |
|---|---|---|---|---|---|
|  |  | $\lambda_{max}$ (nm) | FWHM (nm) |  |  |
| Example 1 | Compound 1 | 531 | 38 | 44 | 88.5 |
| Example 2 | Compound 2 | 517 | 31 | 85 | 95.3 |
| Example 3 | Compound 3 | 521 | 34 | 88 | 94.1 |
| Example 4 | Compound 4 | 515 | 32 | 91 | 98.2 |
| Example 5 | Compound 5 | 513 | 32 | 92 | 98.9 |
| Example 6 | Compound 6 | 512 | 34 | 95 | 99.0 |
| Example 7 | Compound 7 | 634 | 38 | 85 | 95.2 |
| Example 8 | Compound 8 | 636 | 47 | 87 | 94.9 |
| Comparative Example 1 | mPhBODIPY | 530 | 45 | 91 | 91.2 |
| Comparative Example 2 | pPhBODIPY | 605 | 58 | 75 | 93.0 |
| Comparative Example 3 | Spiro-BODIPY | 512 | 25 | 28 | 96.2 |

According to Table 1, it was identified that the color conversion films according to Examples 1 to 8 generally had higher quantum yield and more superior stability compared to Comparative Examples 1 to 3. Particularly, Examples 4 to 6 had quantum yield of 90% or greater and absorption intensity of 98% or greater. In addition, by the maximum emission wavelength of each of the color conversion films of Example 1 to Example 7 having a full width at half maximum of 40 nm or less, excellent color gamut was obtained.

The invention claimed is:

1. A compound represented by Chemical Formula 1:

[Chemical Formula 1]

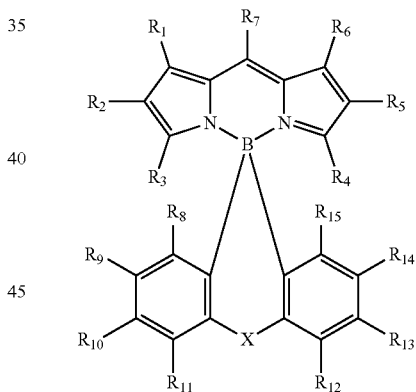

wherein, in the Chemical Formula 1,

X is a direct bond; S; or O;

$R_1$ and $R_6$ are the same as or different from each other, and each independently hydrogen; deuterium; a halogen group; a cyano group; a substituted or unsubstituted alkyl group; a substituted or unsubstituted cycloalkyl group; a substituted or unsubstituted aryl group; or a substituted or unsubstituted heteroaryl group;

$R_3$ and $R_4$ are the same as or different from each other, and each independently a substituted or unsubstituted alkyl group; a substituted or unsubstituted cycloalkyl group; a substituted or unsubstituted aryl group; or a substituted or unsubstituted heteroaryl group;

$R_2$ and $R_5$ are the same as or different from each other, and each independently hydrogen; deuterium; a halogen group; a cyano group; —C(=O)O$R_A$; —OC(=O)$R_B$; a substituted or unsubstituted aryl group; or a substituted or unsubstituted heteroaryl group, and when $R_1$, $R_3$, $R_4$ and $R_6$ are a methyl group, at least one of $R_2$ and $R_5$ is a halogen group; a cyano group; —C(=O)$OR_A$; —OC(=O)$R_B$; a substituted or unsubstituted aryl group; or a substituted or unsubstituted heteroaryl group, with the proviso that R2 and R5 are not both hydrogen when R1, R3, R4, and R6 are each an unsubstituted methyl group, or with the proviso that R1, R3, R4, and R6 are not each an unsubstituted methyl group when R2 and R5 are both hydrogen;

$R_7$ is a substituted or unsubstituted aryl group; a substituted or unsubstituted aryloxy group; a substituted or unsubstituted arylthioxy group; or a substituted or unsubstituted heteroaryl group;

$R_8$, $R_{10}$ to $R_{13}$ and $R_{15}$ are the same as or different from each other, and each independently hydrogen; deuterium; or a halogen group;

$R_9$ and $R_{14}$ are the same as or different from each other, and each independently hydrogen; deuterium; a halogen group; a cyano group; a nitro group; —C(=O)$OR_C$; —OC(=O)$R_D$; a substituted or unsubstituted alkyl group; a substituted or unsubstituted cycloalkyl group; a substituted or unsubstituted aryl group; or a substituted or unsubstituted heteroaryl group; and $R_A$ to $R_D$ are the same as or different from each other, and each independently a substituted or unsubstituted alkyl group; a substituted or unsubstituted aryl group; a substituted or unsubstituted heteroaryl group; or a substituted or unsubstituted coumarin group.

2. The compound of claim 1, wherein $R_3$ and $R_4$ are the same as or different from each other, and each independently a substituted or unsubstituted alkyl group; a cycloalkyl group unsubstituted or substituted with an alkyl group; an aryl group unsubstituted or substituted with one or more substituents selected form the group consisting of a halogen group, an alkyl group, an alkoxy group, a haloalkyl group, a cyano group and an aryl group; or a heteroaryl group unsubstituted or substituted with one or more substituents selected form the group consisting of an alkyl group and an alkoxy group.

3. The compound of claim 1, wherein $R_1$ and $R_6$ are the same as or different from each other, and each independently hydrogen; deuterium; a substituted or unsubstituted alkyl group; a substituted or unsubstituted cycloalkyl group; or a substituted or unsubstituted aryl group.

4. The compound of claim 1, wherein $R_2$ and $R_5$ are the same as or different from each other, and each independently hydrogen; deuterium; a halogen group; a cyano group; —C(=O)$OR_A$; —OC(=O)$R_B$; an aryl group unsubstituted or substituted with one or more substituents selected form the group consisting of an alkyl group and a haloalkyl group; or a substituted or unsubstituted dibenzofuran group; and $R_A$ and $R_B$ are as defined in claim 1.

5. The compound of claim 1, wherein $R_7$ is an aryl group unsubstituted or substituted with one or more substituents selected form the group consisting of an alkyl group, a halogen group, a haloalkyl group and an aryl group; or a substituted or unsubstituted dibenzofuran group.

6. The compound of claim 1, wherein $R_9$ and $R_{14}$ are the same as or different from each other, and each independently hydrogen; deuterium; a halogen group; a cyano group; or a substituted or unsubstituted alkyl group.

7. The compound of claim 1, wherein the compound represented by Chemical Formula 1 is any one of the following compounds:

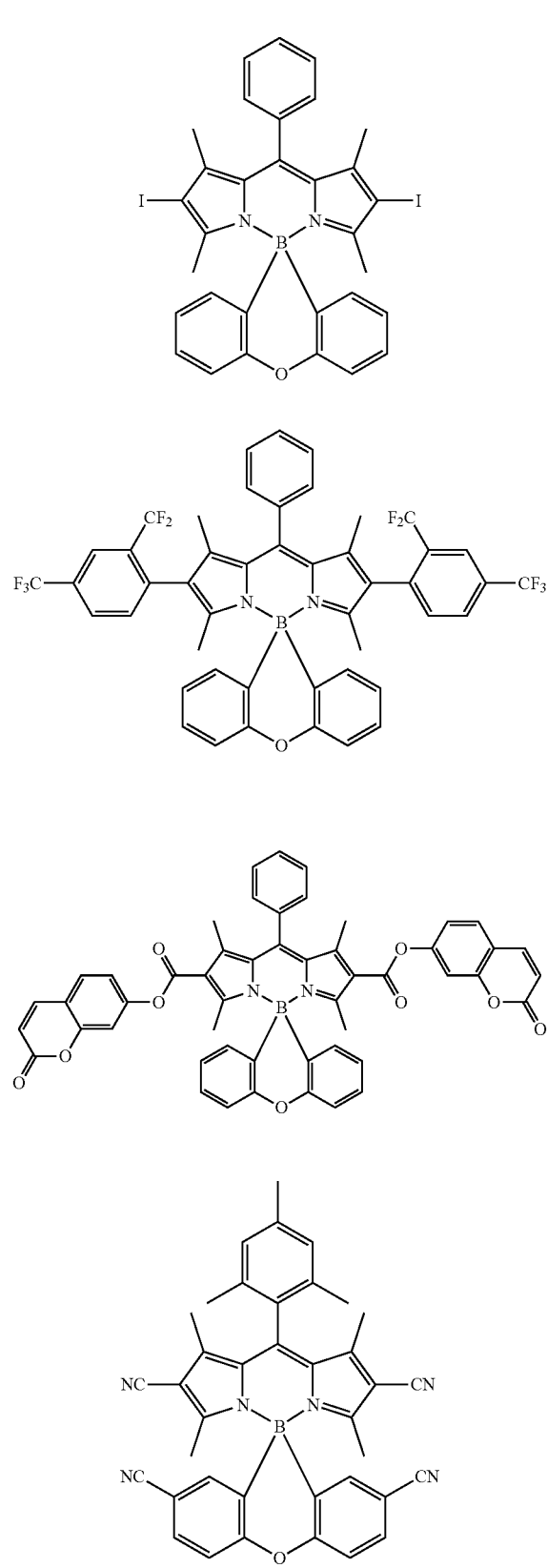

-continued
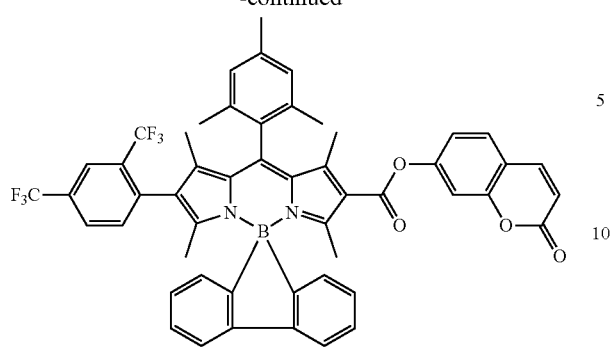
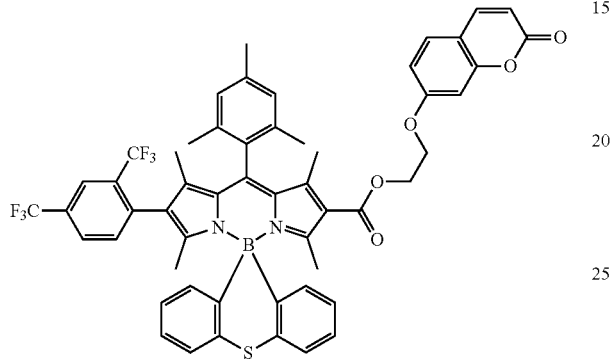
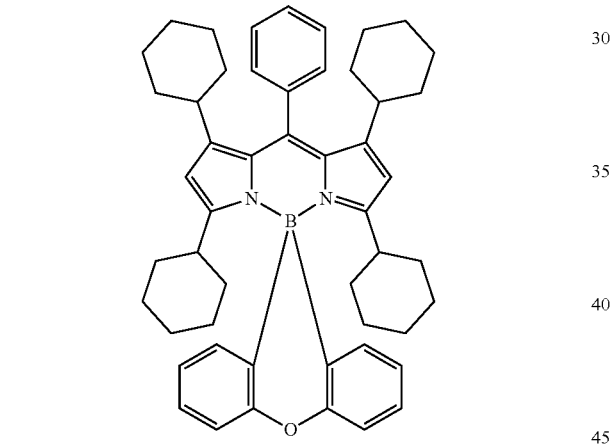
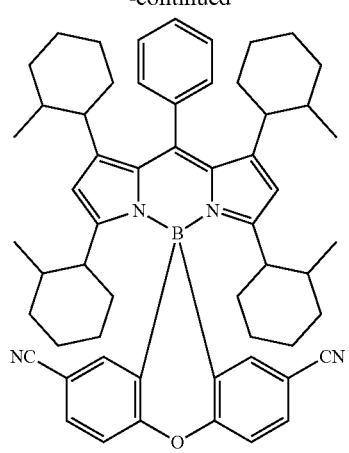
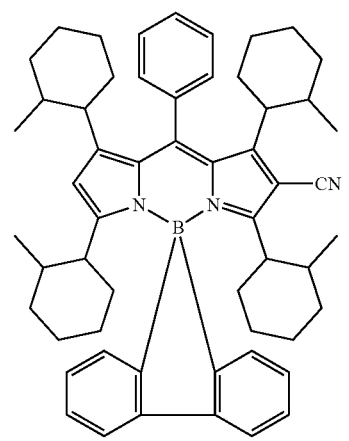
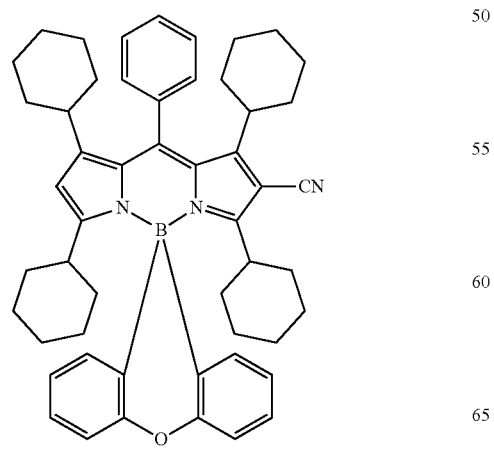
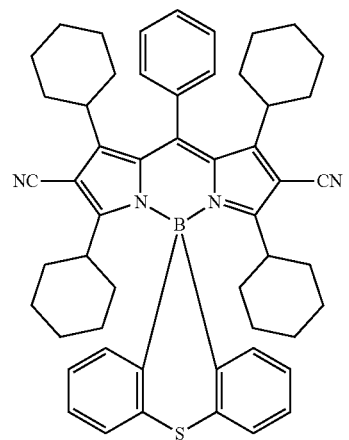

41
-continued
42
-continued
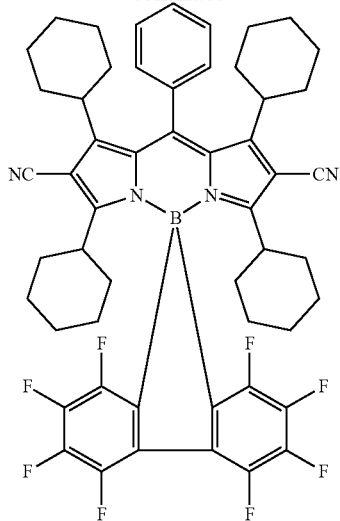
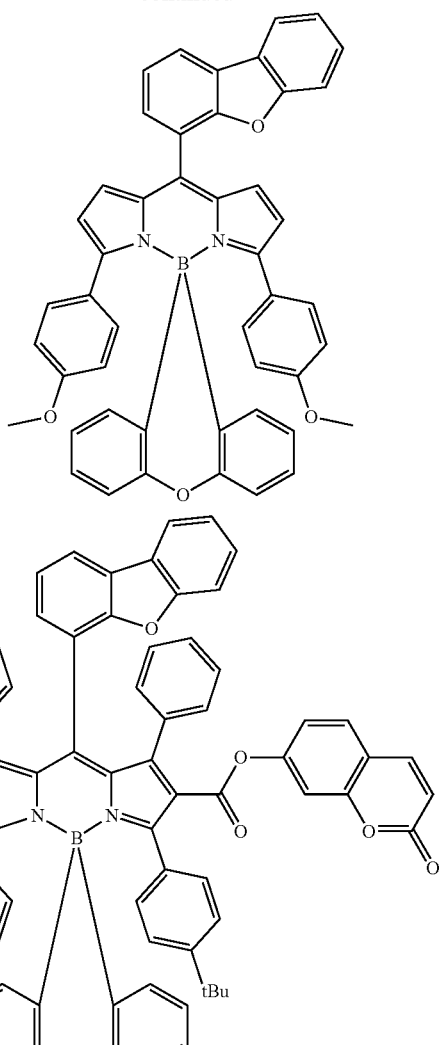
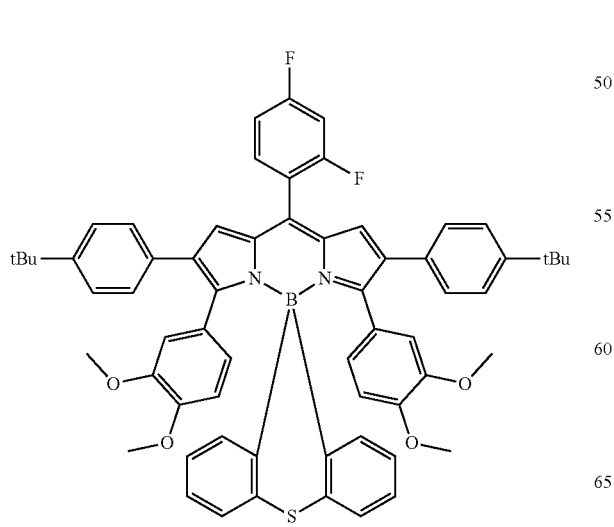

-continued

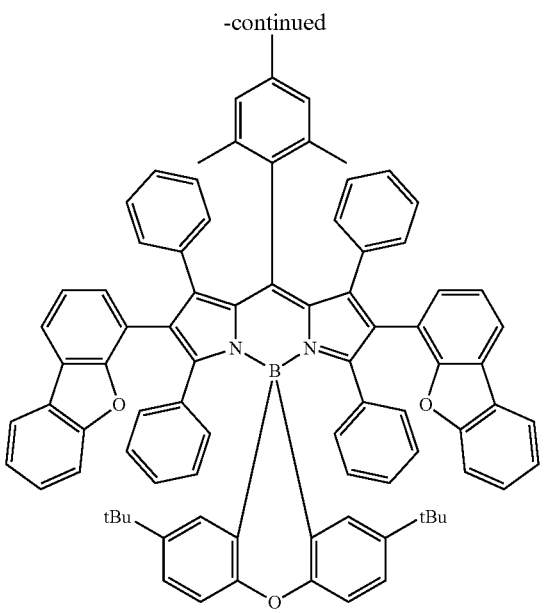

wherein, tBu is tert-butyl.

8. A color conversion film comprising:

a resin matrix; and at least one compound of claim 1 dispersed into the resin matrix.

9. The color conversion film of claim 8, wherein a content of the compound is from 0.001% by weight to 10% by weight based on the total weight of the color conversion film.

10. A backlight unit comprising the color conversion film of claim 8.

11. A display apparatus comprising the backlight unit of claim 10.

12. The color conversion film of claim 8, wherein a material for the resin matrix is a thermoplastic polymer or a thermocurable polymer.

13. The color conversion film of claim 12, wherein the material for the resin matrix is at least one resin selected from a poly(meth)acryl-based resin, a polycarbonate (PC)-based resin, a polystyrene (PS)-based resin, a polyarylene (PAR)-based resin, a polyurethane (PU)-based resin, a styrene-acrylonitrile (SAN)-based resin, a polyvinylidene fluoride (PVDF)-based resin, and a modified polyvinylidene fluoride (modified-PVDF)-based resin.

14. The compound of claim 1, wherein $R_3$ and $R_4$ are the same as or different from each other, and each independently a substituted or unsubstituted methyl group; a cyclohexyl group unsubstituted or substituted with an alkyl group; or a phenyl group unsubstituted or substituted with one or more substituents selected form the group consisting of a halogen group, an alkyl group, an alkoxy group, a haloalkyl group, a cyano group and an aryl group.

15. The compound of claim 1, wherein $R_1$ and $R_6$ are the same as or different from each other, and each independently hydrogen; deuterium; a substituted or unsubstituted methyl group; a substituted or unsubstituted cyclohexyl group; or a substituted or unsubstituted phenyl group.

* * * * *